(12) United States Patent
Yamazaki et al.

(10) Patent No.: US 7,751,088 B2
(45) Date of Patent: Jul. 6, 2010

(54) HIGH-IMAGE-QUALITY HALFTONE PROCESS

(75) Inventors: Satoshi Yamazaki, Nagano-ken (JP); Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 824 days.

(21) Appl. No.: 11/450,326

(22) Filed: Jun. 9, 2006

(65) Prior Publication Data

US 2006/0279789 A1 Dec. 14, 2006

(30) Foreign Application Priority Data

Jun. 10, 2005 (JP) ............................. 2005-171274
Jul. 19, 2005 (JP) ............................. 2005-208776
Sep. 27, 2005 (JP) ............................. 2005-279163

(51) Int. Cl.
*H04N 1/405* (2006.01)
(52) U.S. Cl. .................................. 358/3.14; 358/3.22
(58) Field of Classification Search ................ 358/1.9, 358/2.1, 3.06, 3.14, 3.16, 3.2–3.22, 1.16, 358/3.13
See application file for complete search history.

(56) References Cited

U.S. PATENT DOCUMENTS 5,673,121 A * 9/1997 Wang ........................ 358/3.23

(Continued)

FOREIGN PATENT DOCUMENTS

JP 07-081190 3/1995

(Continued)

OTHER PUBLICATIONS

Abstract of Japanese Patent Publication No. 07-081190, Pub. Date: Mar. 28, 1995, Patent Abstracts of Japan.

(Continued)

*Primary Examiner*—Thomas D Lee
*Assistant Examiner*—Stephen M Brinich
(74) *Attorney, Agent, or Firm*—Martine Penilla & Gencarella, LLP

(57) ABSTRACT

This invention provides a method for generating a dither matrix includes: setting an evaluation function for calculating an evaluation value of the dither matrix; providing a dither matrix as an initial state which stores in respective elements each of a plurality of threshold values for deciding presence or absence of dot formation for each pixel according to an input tone value; fixing an element for storing a threshold value in an increasing order from a smaller threshold value while transposing at least one of the plurality of threshold values stored in a part of the elements and a threshold value stored in another part of the elements; and outputting a dither matrix in which elements for storing are fixed with regard to at least part of the plurality of threshold values. The step of fixing an element for storing a threshold value includes: transposing mutually part of the threshold values whose elements for storing have not been fixed, among the plurality of threshold values; calculating an evaluation value of the dither matrix in which the threshold values have been transposed, using the evaluation function; fixing an element for storing a smallest evaluation threshold value among the threshold values whose elements for storing have not been fixed, according to a compliance of the evaluation value to a predetermined criterion; and repeating the steps from the transposing step to the fixing step until elements for storing at least part of the plurality of threshold values are fixed.

11 Claims, 22 Drawing Sheets

U.S. PATENT DOCUMENTS

| | | | |
|---|---|---|---|
| 7,505,177 B2 * | 3/2009 | Wechgeln et al. | 358/3.13 |
| 2002/0102007 A1 * | 8/2002 | Wang | 382/100 |
| 2002/0114011 A1 * | 8/2002 | Sharma et al. | 358/3.06 |
| 2005/0254096 A1 * | 11/2005 | Fischer et al. | 358/3.17 |
| 2006/0114512 A1 * | 6/2006 | Von Wechgeln et al. | 358/3.06 |
| 2006/0197990 A1 * | 9/2006 | Myodo et al. | 358/3.06 |

FOREIGN PATENT DOCUMENTS

| | | |
|---|---|---|
| JP | 07-177351 | 7/1995 |
| JP | 10-329381 | 12/1998 |
| WO | WO 2005/043885 | 5/2005 |

OTHER PUBLICATIONS

Abstract of Japanese Patent Publication No. 07-177351, Pub. Date: Jul. 14, 1995, Patent Abstracts of Japan.

Abstract of Japanese Patent Publication No. 10-329381, Pub. Date: Dec. 15, 1998, Patent Abstracts of Japan.

Susumu lmakawa et al., "Noise Evaluation Method for Halftone Color Image," Ricoh Technical Report No. 23, Sep. 1997, pp. 53-59.

* cited by examiner

Overall dot distribution $$VTF(u) = 5.05 \cdot \exp\left(\frac{-0.138\pi L \cdot u}{180}\right) \cdot \left\{1 - \exp\left(\frac{-0.1\pi L \cdot u}{180}\right)\right\}$$

$$\text{Granularity index} = K \int FS(u) \cdot VTF(u)\, du$$

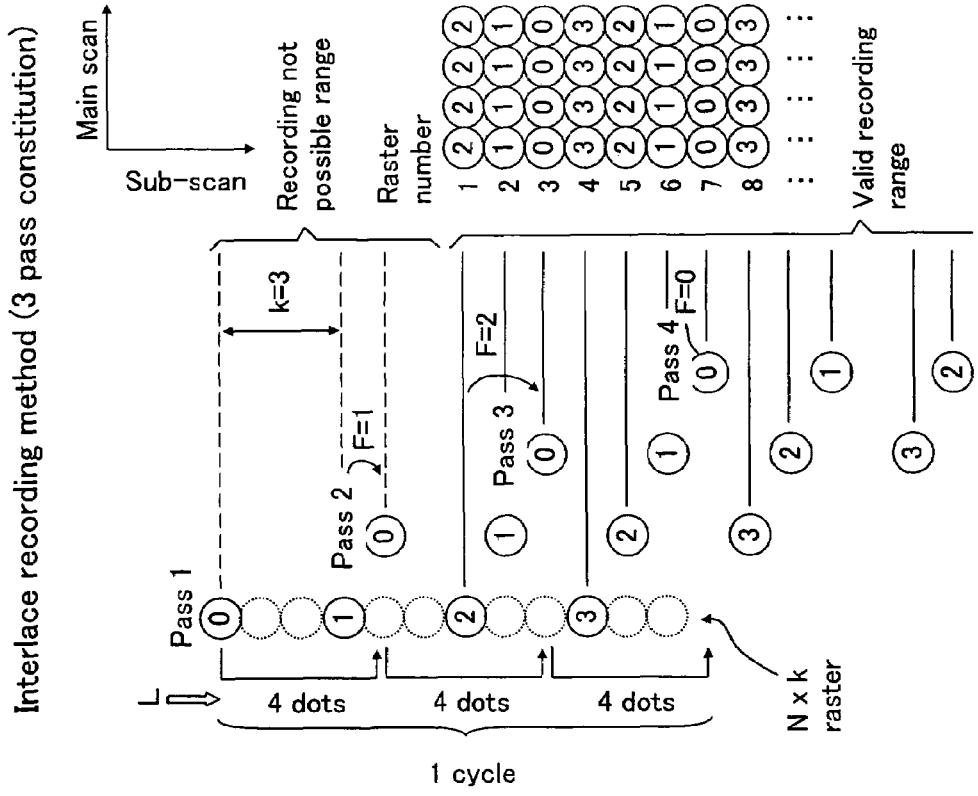

Third Variation Example

Fig.21(A)

|   | | | | | | |
|---|---|---|---|---|---|---|
| 1 | Forward | Forward | Forward | Forward | Forward | Forward |
| 2 | Backward | Backward | Backward | Backward | Backward | Backward |
| 3 | Forward | Forward | Forward | Forward | Forward | Forward |
| 4 | Backward | Backward | Backward | Backward | Backward | Backward |
| 5 | Forward | Forward | Forward | Forward | Forward | Forward |
| 6 | Backward | Backward | Backward | Backward | Backward | Backward |

Fig.21(B)

|   | | | | | | |
|---|---|---|---|---|---|---|
| 1 | Forward | Forward | Forward | Forward | Forward | Forward |
| 2 |  | Backward | Backward | Backward | Backward | Backward | Backward |
| 3 | Forward | Forward | Forward | Forward | Forward | Forward |
| 4 |  | Backward | Backward | Backward | Backward | Backward | Backward |
| 5 | Forward | Forward | Forward | Forward | Forward | Forward |
| 6 |  | Backward | Backward | Backward | Backward | Backward | Backward |

Fig.21(C)

|   | | | | | | |
|---|---|---|---|---|---|---|
| 1 |  | Forward | Forward | Forward | Forward | Forward | Forward |
| 2 | Backward | Backward | Backward | Backward | Backward | Backward |
| 3 |  | Forward | Forward | Forward | Forward | Forward | Forward |
| 4 | Backward | Backward | Backward | Backward | Backward | Backward |
| 5 |  | Forward | Forward | Forward | Forward | Forward | Forward |
| 6 | Backward | Backward | Backward | Backward | Backward | Backward |

Fifth Variation Example

Granularity index of dither matrix as initial state

HIGH-IMAGE-QUALITY HALFTONE PROCESS

BACKGROUND

1. Technical Field

This invention relates to a technology for printing an image by forming dots on a print medium.

2. Related Art

As an output device for images created by a computer, images shot using a digital camera, or the like, printing apparatuses that print images by forming dots on a print medium are widely used. Such a printing apparatus has tone values of dots which can be formed fewer than input tone values, and therefore expresses tone through halftone processing. The organizational dither method using a dither matrix is widely used as one of such halftone processing. The organizational dither method may have much effect on the image quality depending on the contents of the dither matrix, and therefore the dither matrix has been optimized by an analytical approach such as simulated annealing or genetic algorism using an evaluation function considering human vision as disclosed in JP-A-7-177351, JP-A-7-81190, and JP-A-1-329381, for example.

However, such optimization processing requires a complex computational algorism and huge amount of computation, and therefore there have remained difficult problems in possibility of processing for especially complex optimization problem.

SUMMARY

An advantage of some aspects of the invention is to provide a highly efficient computation technique of generating a dither matrix.

This invention provides a method for generating a dither matrix includes: setting an evaluation function for calculating an evaluation value of the dither matrix; providing a dither matrix as an initial state which stores in respective elements each of a plurality of threshold values for deciding presence or absence of dot formation for each pixel according to an input tone value; fixing an element for storing a threshold value in an increasing order from a smaller threshold value while transposing at least one of the plurality of threshold values stored in a part of the elements and a threshold value stored in another part of the elements; and outputting a dither matrix in which elements for storing are fixed with regard to at least part of the plurality of threshold values. The step of fixing an element for storing a threshold value includes: transposing mutually part of the threshold values whose elements for storing have not been fixed, among the plurality of threshold values; calculating an evaluation value of the dither matrix in which the threshold values have been transposed, using the evaluation function; fixing an element for storing a smallest evaluation threshold value among the threshold values whose elements for storing have not been fixed, according to a compliance of the evaluation value to a predetermined criterion; and repeating the steps from the transposing step to the fixing step until elements for storing at least part of the plurality of threshold values are fixed.

The present invention optimizes a dither matrix by fixing storage elements in the order from a threshold value for controlling dot locations in a highlight area where the granularity of dots is conspicuous, and thereby provides greater degree of freedom of design for the highlight area where the granularity of dots is conspicuous, and achieves extremely high processing efficiency of optimization since it is only necessary to calculate the granularity index, for example, for each input tone. The 'compliance of the evaluation value to the predetermined criterion' may be based on convergence of calculation or based on being not greater than a predetermined value. In the case of image output device such as CRT, a threshold value for controlling dot locations in a highlight area where the granularity of dots is conspicuous is in reverse.

If this kind of program or program recorded on a recording medium is read into a computer and the various functions described above are realized using the computer, even when the dot formation positions are displaced between the dot formation head forward scan and backward scan, it is possible to suppress to a minimum the effect due to this. Because of this, it is possible to rapidly print high image quality images and also possible to simplify the mechanism and control for adjusting the dot formation position with the forward scan and backward scan.

BRIEF DESCRIPTION OF THE DRAWINGS

FIGS. 20(A) and 20(B) are explanatory drawings showing the printing status using the interlace recording method for the second variation example of the invention.

FIGS. 21(A), 21(B), and 21(C) are explanatory drawings showing the printing status using the overlap recording method for the third variation example of the invention.

DESCRIPTION OF EXEMPLARY EMBODIMENTS

The present invention is explained in the following sequence based on embodiments.

Figure 1:
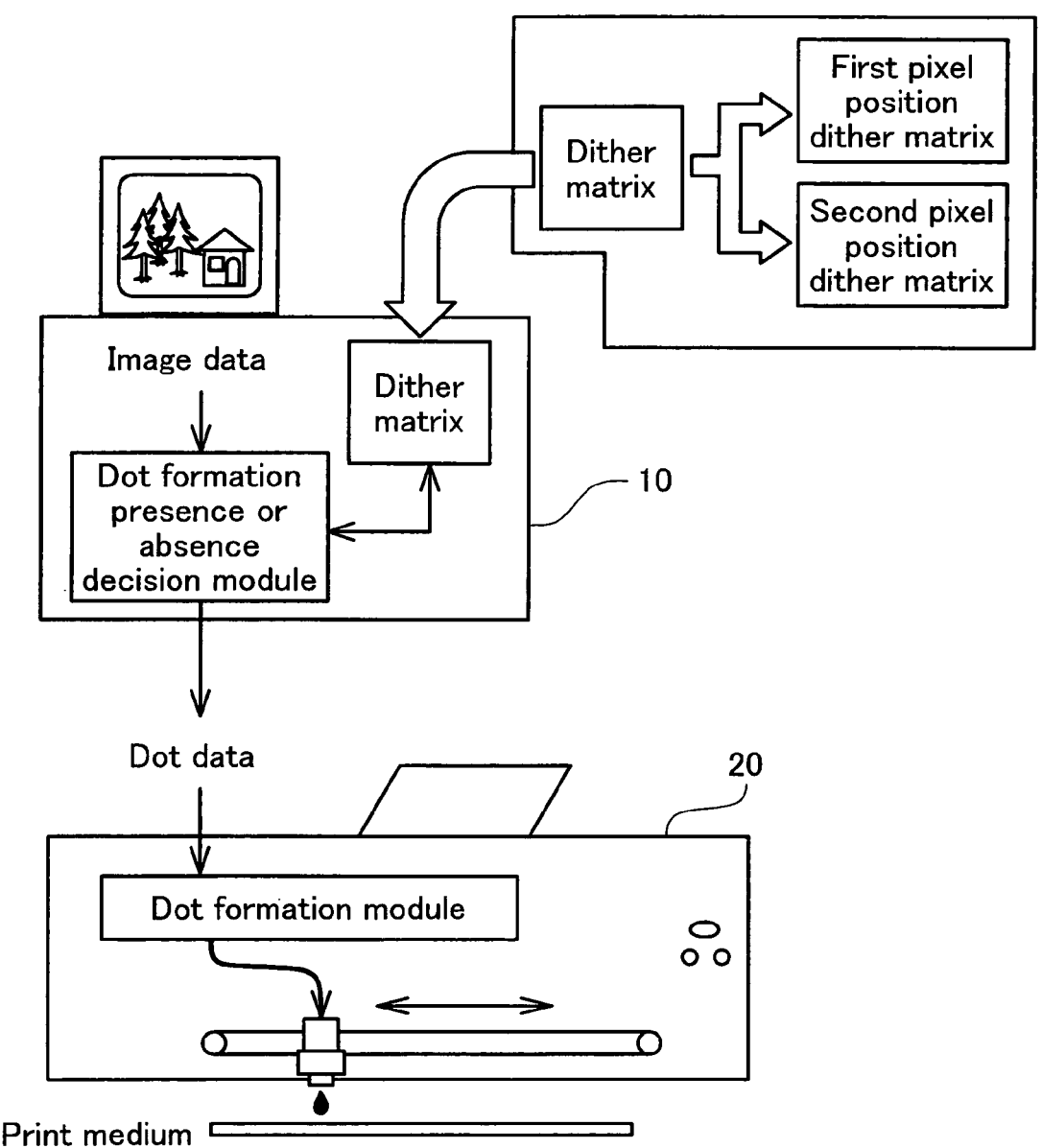
FIG. 1 is an explanatory drawing showing the summary of a printing system as the printing apparatus of this embodiment.

A. Summary of the Embodiment:

B. Device Constitution:

C. Summary of the Image Printing Process:

D. Principle of Suppressing Degradation of Image Quality Due to Dot Position misalignment:

E. Dither Matrix Generating Method:

F. Variation Examples:

A. Summary of the Embodiments:

Before starting the detailed description of the embodiment, a summary of the embodiment is described while referring to FIG. 1. FIG. 1 is an explanatory drawing showing a summary of a printing system as the printing apparatus of this embodiment. As shown in the drawing, the printing system consists of a computer 10 as the image processing device, a printer 20 that prints the actual images under the control of the computer 10 and the like, and entire system is unified as one and functions as a printing apparatus.

A dot formation presence or absence decision module and a dither matrix are provided in the computer 10, and when the dot formation presence or absence decision module receives image data of the image to be printed, while referencing the dither matrix, data (dot data) is generated that represents the presence or absence of dot formation for each pixel, and the obtained dot data is output toward the printer 20.

A dot formation head 21 that forms dots while moving back and forth over the print medium and a dot formation module that controls the dot formation at the dot formation head 21 are provided in the printer 20. When the dot formation module receives dot data output from the computer 10, dot data is supplied to the head to match the movement of the dot formation head 21 moving back and forth. As a result, the dot formation head 21 that moves back and forth over the print medium is driven at a suitable timing, forms dots at suitable positions on the print medium, and an image is printed.

Also, with the printing apparatus of this embodiment, by performing so called bidirectional printing for which dots are formed not only during forward scan of the dot formation head 21 but also during backward scan, it is possible to rapidly print images. It makes sense that when performing bidirectional printing, when dot formation position misalignment occurs between dots formed during forward scan and dots formed during backward scan, the image quality is degraded. In light of this, it is normal to have built into this kind of printer a special mechanism or control for adjusting at a high precision the timing of dot formation of one of the back and forth movements to the other timing, and this is one factor in causing printers to be larger or more complex.

Considering this kind of point, with the printing apparatus of this embodiment shown in FIG. 1, as the dither matrix referenced when generating dot data from the image data, a matrix having at least the following two characteristics is used. Specifically, as the first characteristic, this is a matrix for which it is possible to classify the dither matrix pixel positions into a first pixel position group and a second pixel position group. Here, the first pixel position and the second pixel position are pixel positions having a relationship whereby when one has dots formed at either the forward scan or the backward scan, the other has dots formed at the opposite. Then as the second characteristic, this is a matrix for which the dither matrix, a matrix for which the threshold values set for the first pixel positions are removed from the dither matrix (first pixel position matrix), and a matrix for which the threshold values set for the second pixel positions are removed (second pixel position matrix) all have blue noise characteristics.

Here, though the details are described later, the inventors of this application discovered the following kind of new findings. Specifically, there is a very strong correlation between the image quality of images for which the dot formation position was displaced between the forward scan and the backward scan and the image quality of images made only by dots formed during forward scan (images obtained with only the dots formed during the backward scan removed from the original image; hereafter called "forward scan images"), or the image quality of images made only by dots formed during backward scan (images obtained with only the dots formed during the forward scan removed from the original image; hereafter called "backward scan images"). Then, if the image quality of the forward scan images or the image quality of the backward scan images is improved, even when dot formation position misalignment occurs between the forward scan and the backward scan of bidirectional printing, it is possible to suppress degradation of image quality. Therefore, the dither matrix can be classified by the characteristics noted above, specifically, it is possible to classify as a first pixel position matrix and a second pixel position matrix, and if dot data is generated using a dither matrix such as one for which these three matrixes have blue noise characteristics, it is possible to have both the forward scan images and the backward images be good image quality images, so it is possible to suppress to a minimum the degradation of image quality even when there is dot formation position misalignment during bidirectional printing. As a result, when adjusting the dot formation timing of one of the back and forth movements to the other timing, there is no demand for high precision, so it is possible to have a simple mechanism and control for adjustment, and thus, it is possible to avoid the printer becoming large and complex. Following, this kind of embodiment is described in detail.

Figure 2:
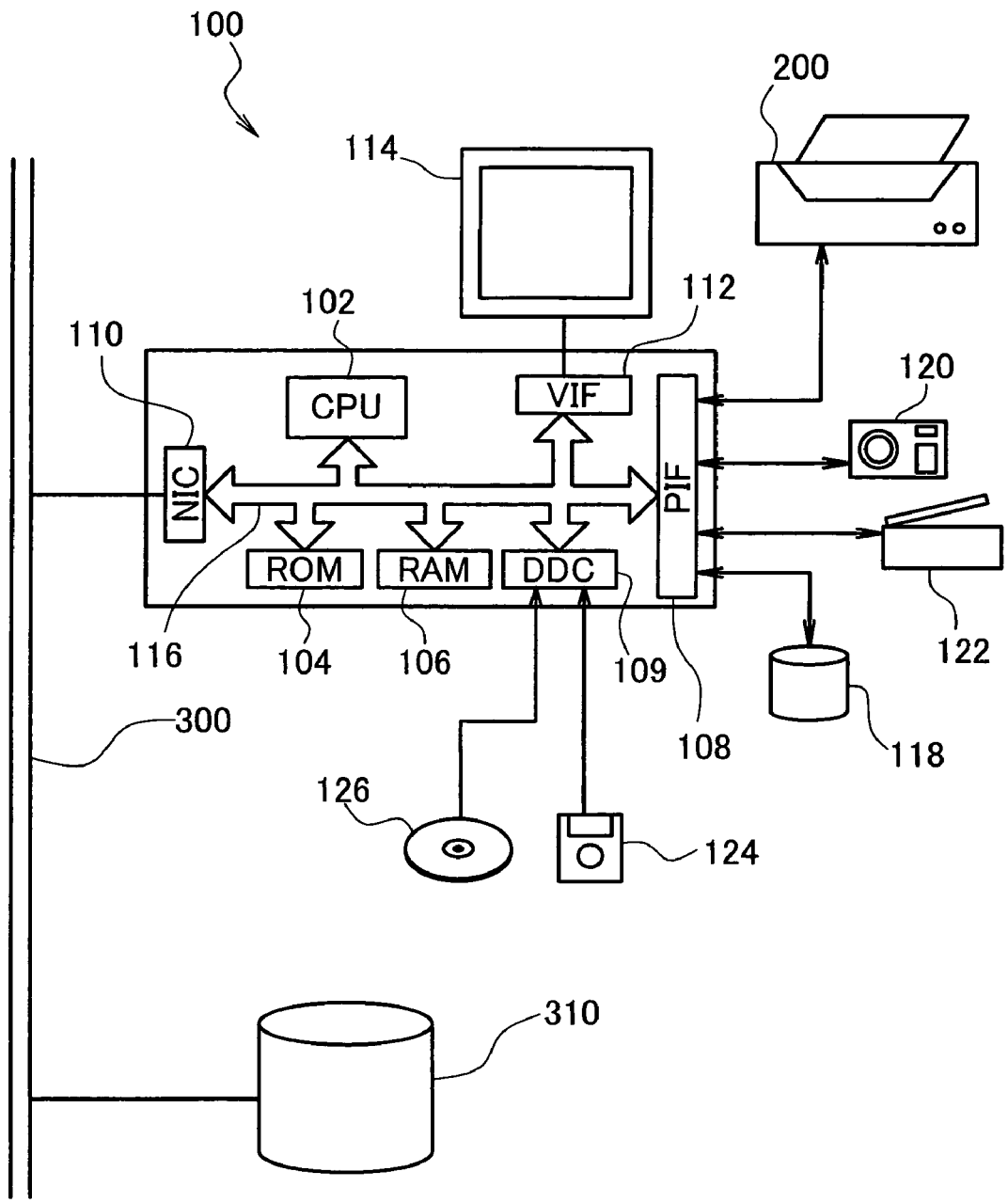
FIG. 2 is an explanatory drawing showing the constitution of a computer as the image processing device of this embodiment.

B. Device Constitution:

FIG. 2 is an explanatory drawing showing the constitution of the computer 100 as the image processing device of this embodiment. The computer 100 is a known computer constituted by a CPU 102 as the core, a ROM 104, a RAM 106 and the like being mutually connected by a bus 116.

Connected to the computer 100 are a disk controller DDC 109 for reading data of a flexible disk 124, a compact disk 126 or the like, a peripheral device interface PIF 108 for performing transmission of data with peripheral devices, a video interface VIF 112 for driving a CRT 113, and the like. Connected to the PIF 108 are a color printer 200 described later, a hard disk 118, or the like. Also, if a digital camera 120 or color scanner 122 or the like is connected to the PIF 108, it is possible to perform image processing on images taken by the digital camera 120 or the color scanner 122. Also, if a network interface card NIC 110 is mounted, the computer 100 is connected to the communication line 300, and it is possible to fetch data stored in the storage device 310 connected to the communication line. When the computer 100 fetches image data of the image to be printed, by performing the specified image processing described later, the image data is converted to data representing the presence or absence of dot formation for each pixel (dot data), and output to the color printer 200.

Figure 3:
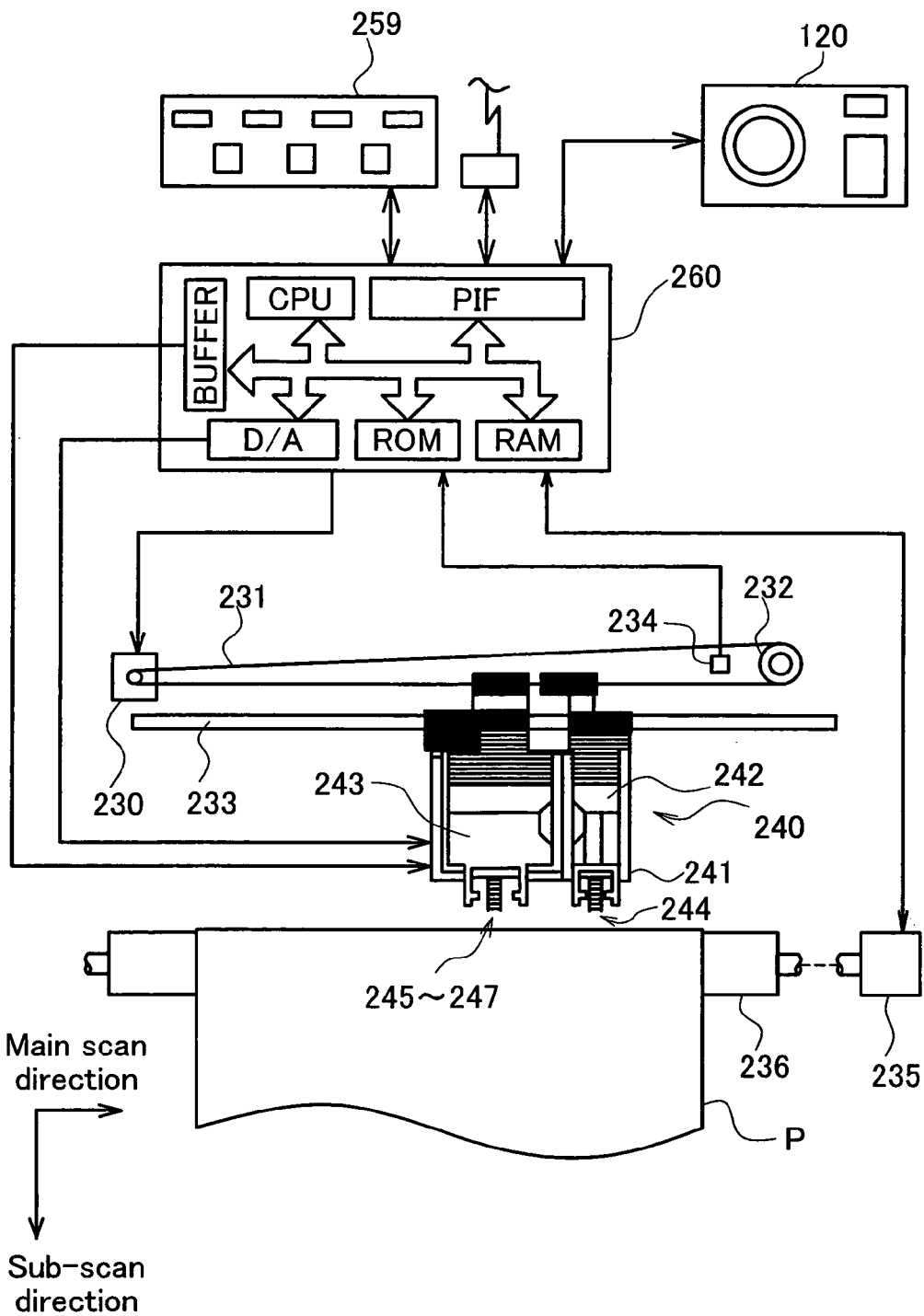
FIG. 3 is an explanatory drawing showing the schematic structure of the color printer of this embodiment.

FIG. 3 is an explanatory drawing showing the schematic structure of the color printer 200 of this embodiment. The color printer 200 is an ink jet printer capable of forming dots of four colors of ink including cyan, magenta, yellow, and black. Of course, in addition to these four colors of ink, it is also possible to use an inkjet printer capable of forming ink dots of a total of six colors including an ink with a low dye or pigment concentration of cyan (light cyan) and an ink with a low dye or pigment concentration of magenta (light magenta). Note that following, in some cases, cyan ink, magenta ink, yellow ink, black ink, light cyan ink, and light magenta ink are respectively called C ink, M ink, Y ink, K ink, LC ink, and LM ink.

As shown in the drawing, the color printer 200 consists of a mechanism that drives a printing head 241 built into a carriage 240 and performs blowing of ink and dot formation, a mechanism that moves this carriage 240 back and forth in the axial direction of a platen 236 by a carriage motor 230, a mechanism that transports printing paper P by a paper feed motor 235, a control circuit 260 that controls the dot formation, the movement of the carriage 240 and the transport of the printing paper, and the like.

Mounted on the carriage 240 are an ink cartridge 242 that holds K ink, and an ink cartridge 243 that holds each type of ink C ink, M ink, and Y ink. When the ink cartridges 242 and 243 are mounted on the carriage 240, each ink within the cartridge passes through an introduction tube that is not illustrated and is supplied to each color ink spray heads 244 to 247 provided on the bottom surface of the printing head 241.

Figure 4:
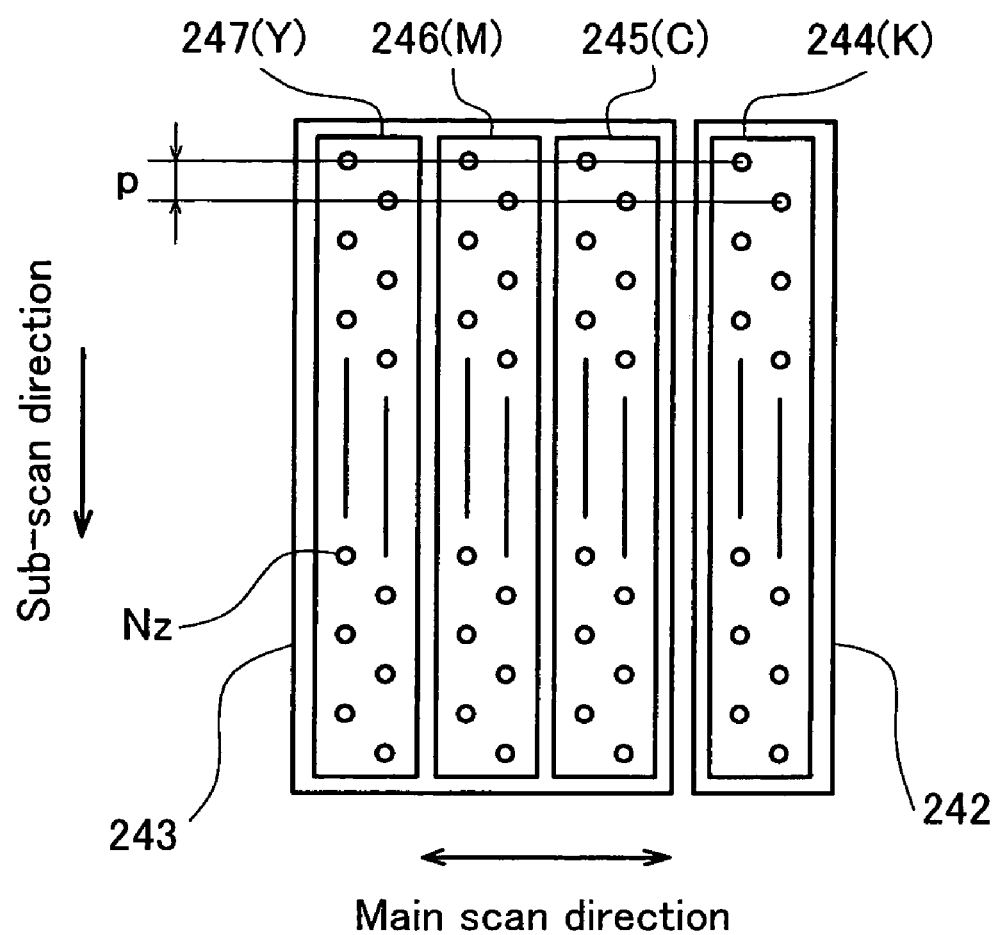
FIG. 4 is an explanatory drawing showing an array of inkjet nozzles for an ink spray head.

FIG. 4 is an explanatory drawing showing an array of inkjet nozzle Nz for the ink spray heads 244 to 247. As shown in the drawing, on the bottom surface of the ink spray heads are formed four sets of nozzle arrays that spray each color of ink C, M, Y, and K, and 48 nozzles Nz per one set of nozzle arrays are arranged at a fixed nozzle pitch k.

The control circuit 260 of the color printer 200 is constituted by a CPU, ROM, RAM, PIF (peripheral device interface), and the like mutually connected by a bus, and by controlling the operation of the carriage motor 230 and the paper feed motor 235, it controls the main scan movement and Sub-scan movement of the carriage 240. Also, when the dot data output from the computer 100 is received, by supplying dot data to the ink spray heads 244 to 247 to match the main scan or Sub-scan movement of the carriage 240, it is possible to drive these heads.

The color printer 200 having the kind of hardware constitution noted above, by driving the carriage motor 230, moves each color ink spray head 244 to 247 back and forth in the main scan direction, and by driving the paper feed motor 235, moves the printing paper P in the Sub-scan direction. The control circuit 260, by driving the nozzles at a suitable timing based on dot data to match the back and forth movement of the carriage 240 (main scan) and the paper feed movement of the print medium (Sub-scan), forms suitable colored ink dots at suitable positions on the print medium. By working in this way, the color printer 200 is able to print color images on the printing paper.

Note that though the printer of this embodiment was described as a so called inkjet printer that forms ink dots by spraying ink drops toward a print medium, it can also be a printer that forms dots using any method. For example, the invention of this application, instead of spraying ink drops, can also be suitably applied to a printer that forms dots by adhering each color of toner powder onto the print medium using static electricity, or a so called dot impact method printer.

Figure 5:
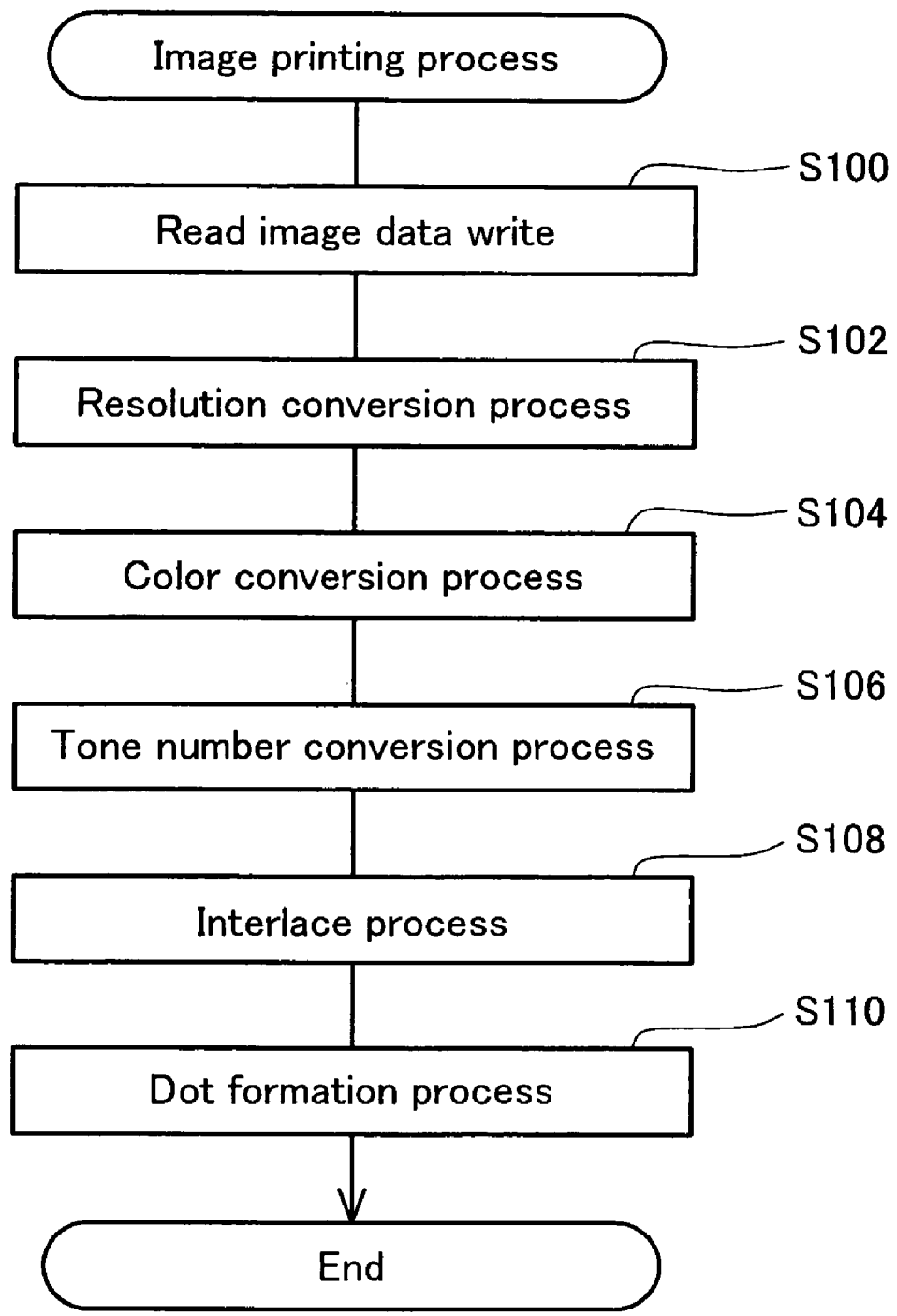
FIG. 5 is a flow chart showing the flow of the image printing process of this embodiment.

C. Summary of the Image Printing Process:

FIG. 5 is a flow chart showing the process flow of adding a specified image process by the computer 100 to an image to be printed, converting image data to dot data expressed by the presence or absence of dot formation, supplying to the color printer 200 as control data the obtained dot data, and printing the image.

When the computer 100 starts image processing, first, it starts reading the image data to be converted (step S100). Here, the image data is described as RGB color image data, but it is not limited to color image data, and it is also possible to apply this in the same way for black and white image data as well.

After reading of the image data, the resolution conversion process is started (step S102). The resolution conversion process is a process that converts the resolution of the read image data to resolution (printing resolution) at which the color printer 200 is to print the image. When the print resolution is higher than the image data resolution, an interpolation operation is performed and new image data is generated to increase the resolution. Conversely, when the image data resolution is higher than the printing resolution, the resolution is decreased by culling the read image data at a fixed rate. With the resolution conversion process, by performing this kind of operation on the read image data, the image data resolution is converted to the printing resolution.

Once the image data resolution is converted to the printing resolution in this way, next, color conversion processing is performed (step S104). Color conversion processing is a process of converting RGB color image data expressed by a combination of R, G, and B tone values to image data expressed by combinations of tone values of each color used for printing. As described previously, the color printer 200 prints images using four colors of ink C, M, Y, and K. In light of this, with the color conversion process of this embodiment, the image data expressed by each color RGB undergoes the process of conversion to data expressed by the tone values of each color C, M, Y, and K.

Figure 6:
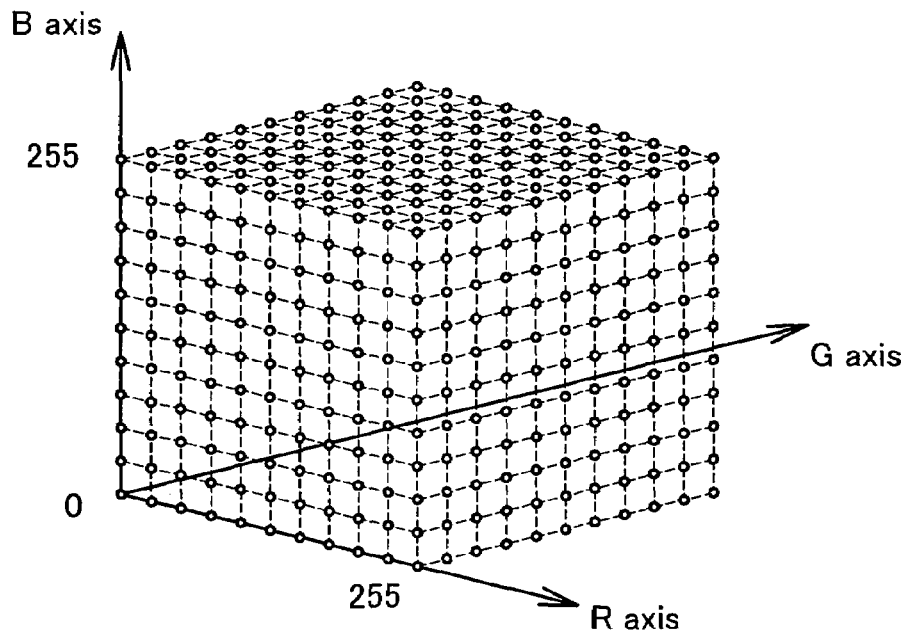
FIG. 6 is an explanatory drawing conceptually showing an LUT referenced for color conversion processing.

The color conversion process is able to be performed rapidly by referencing a color conversion table (LUT). FIG. 6 is an explanatory drawing that conceptually shows the LUT referenced for color conversion processing. The LUT can be thought of as a three dimensional number chart if thought of in the following way. First, as shown in FIG. 6, we think of a color space using three orthogonal axes of the R axis, the G axis, and the B axis. When this is done, all the RGB image data can definitely be displayed correlated to coordinate points within the color space. From this, if the R axis, the G axis, and the B axis are respectively subdivided and a large number of grid points are set within the color space, each of the grid points can be thought of as representing the RGB image data, and it is possible to correlate the tone values of each color C, M, Y, and K corresponding to each RGB image data to each grid point. The LUT can be thought of as a three dimensional number chart in which is correlated and stored the tone values of each color C, M, Y, and K to the grid points provided within the color pace in this way. If color conversion processing is performed based on the correlation of RGB color image data and tone data of each color C, M, YU, and K stored in this kind of LUT, it is possible to rapidly convert RGB color image data to tone data of each color C, M, Y, and K.

When tone data of each color C, M, Y, and K is obtained in this way, the computer 100 starts the tone number conversion process (step S106). The tone number conversion process is the following kind of process. The image data obtained by the color conversion process, if the data length is 1 byte, is tone data for which values can be taken from tone value 0 to tone value 255 for each pixel. In comparison to this, the printer displays images by forming dots, so for each pixel, it is only possible to have either state of "dots are formed" or "dots are not formed." In light of this, instead of changing the tone value for each pixel, with this kind of printer, images are expressed by changing the density of dots formed within a specified area. The tone number conversion process is a process that, to generate dots at a suitable density according to the tone value of the tone data, decides the presence or absence of dot formation for each pixel.

As a method of generating dots at a suitable density according to the tone values, various methods are known such as the error diffusion method and the dither method, but with the Tone number conversion process of this embodiment, the method called the dither method is used. The dither method of this embodiment is a method that decides the presence or absence of dot formation for each pixel by comparing the threshold value set in the dither matrix and the tone value of the image data for each pixel. Following is a simple description of the principle of deciding on the presence or absence of dot formation using the dither method.

Figure 7:
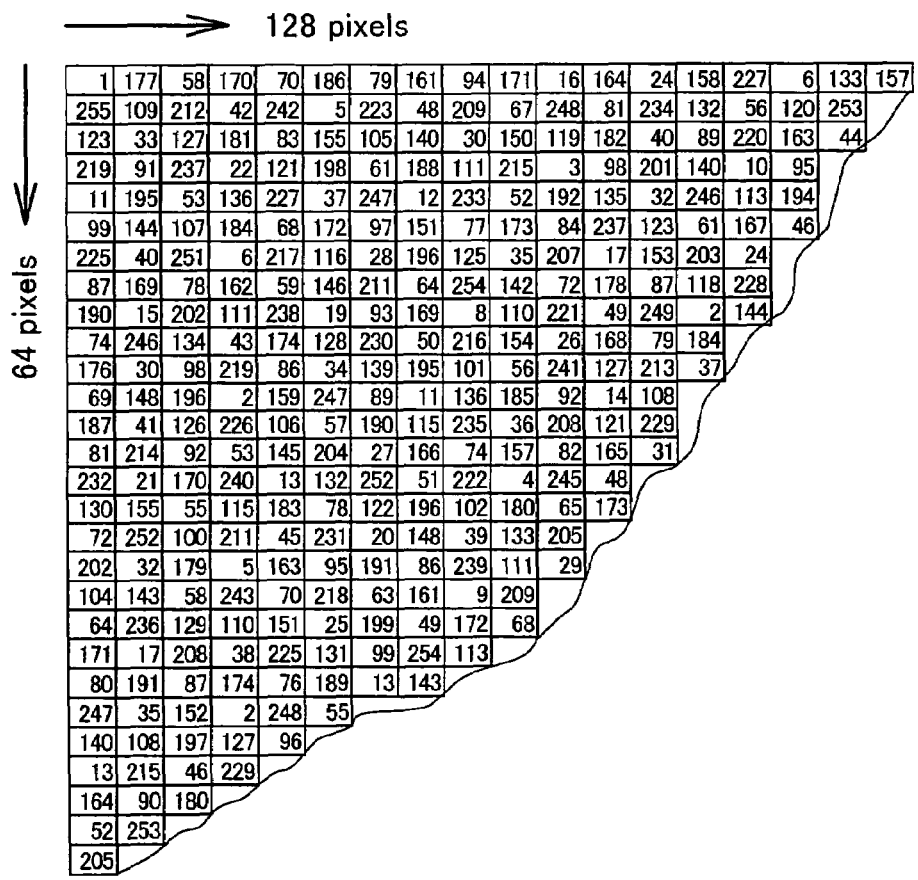
FIG. 7 is an explanatory drawing conceptually showing an example of part of a dither matrix.

FIG. 7 is an explanatory drawing that conceptually shows an example of part of a dither matrix. The matrix shown in the drawing randomly stores threshold values selected thoroughly from a tone value range of 1 to 255 for a total of 8192 pixels, with 128 pixels in the horizontal direction (main scan direction) and 64 pixels in the vertical direction (Sub-scan direction). Here, selecting from a range of 1 to 255 for the tone value of the threshold value with this embodiment is because in addition to having the image data as 1 byte data that can take tone values from values 0 to 255, when the image data tone value and the threshold value are equal, it is decided that a dot is formed at that pixel.

Specifically, when dot formation is limited to pixels for which the image data tone value is greater than the threshold value (specifically, dots are not formed on pixels for which the tone value and threshold value are equal), dots are definitely not formed at pixels having threshold values of the same value as the largest tone value that the image data can have. To avoid this situation, the range that the threshold values can have is made to be a range that excludes the maximum tone value from the range that the image data can have. Conversely, when dots are also formed on pixels for which the image data tone value and the threshold value are equal, dots are always formed at pixels having a threshold value of the same value as the minimum tone value that the image data has. To avoid this situation, the range that the threshold values can have is made to be a range excluding the minimum tone value from the range that the image data can have. With this embodiment, the tone values that the image data can have is from 0 to 255, and since dots are formed at pixels for which the image data and the threshold value are equal, the range that the threshold values can have is set to 1 to 255. Note that the size of the dither matrix is not limited to the kind of size shown by example in FIG. 7, but can also be various sizes including a matrix for which the vertical and horizontal pixel count is the same.

Figure 8:
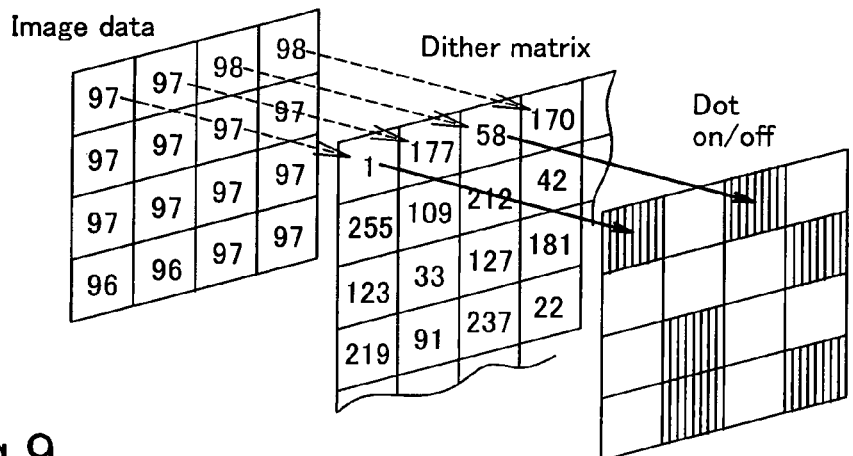
FIG. 8 is an explanatory drawing conceptually showing the state of deciding the presence or absence of dot formation for each pixel while referencing the dither matrix.

FIG. 8 is an explanatory drawing that conceptually shows the state of deciding the presence or absence of dot formation for each pixel while referring to the dither matrix. When deciding on the presence or absence of dot formation, first, a pixel for deciding about is selected, and the tone value of the image data for that pixel and the threshold value stored at the position corresponding in the dither matrix are compared. The fine dotted line arrow shown in FIG. 8 typically represents the comparison for each pixel of the tone value of the image data and the threshold value stored in the dither matrix. For example, for the pixel in the upper left corner of the image data, the threshold value of the image data is 97, and the threshold value of the dither matrix is 1, so it is decided that dots are formed at this pixel. The arrow shown by the solid line in FIG. 8 typically represents the state of it being decided that dots are formed in this pixel, and of the decision results being written to memory. Meanwhile, for the pixel that is adjacent at the right of this pixel, the tone value of the image data is 97, and the threshold value of the dither matrix is 177, and since the threshold value is larger, it is decided that dots are not formed at this pixel, With the dither method, by deciding whether or not to form dots for each pixel while referencing the dither matrix in this way, image data is converted to data representing the presence or absence of dot formation for each pixel. In this way, if using the dither method, it is possible to decide the presence or absence of dot formation for each pixel with a simple process of comparing the tone value of the image data and the threshold value set in the dither matrix, so it is possible to rapidly implement the tone number conversion process.

Also, when the image data tone value is determined, as is clear from the fact that whether or not dots are formed on each pixel is determined by the threshold value set in the dither matrix, with the dither method, it is possible to actively control the dot generating status by the threshold value set in the dither matrix. With the tone number conversion process of this embodiment, using this kind of feature of the dither method, by deciding on the presence or absence of dot formation for each pixel using the dither matrix having the special characteristics described later, even in cases when there is dot formation position misalignment between dots formed during forward scan and dots formed during backward scan when doing bidirectional printing, it is possible to suppress to a minimum the degradation of image quality due to this. The principle of being able to suppress to a minimum the image quality degradation and the characteristics provided with a dither matrix capable of this are described in detail later.

When the tone number conversion process ends and data representing the presence or absence of dot formation for each pixel is obtained from the tone data of each color C, M, Y, and K, this time, the interlace process starts (step S108). The interlace process is a process that realigns the sequence of transfer of image data converted to the expression format according to the presence or absence of dot formation to the color printer 200 while considering the sequence by which dots are actually formed on the printing paper. The computer 100, after realigning the image data by performing the interlace process, outputs the finally obtained data as control data to the color printer 200 (step S110).

The color printer 200 prints images by forming dots on the printing paper according to the control data supplied from the computer 100 in this way. Specifically, as described previously using FIG. 3, the main scan and the Sub-scan of the carriage 240 are performed by driving the carriage motor 230 and the paper feed motor 235, and the head 241 is driven based on the dot data to match these movements, and ink drops are sprayed. As a result, suitable color ink dots are formed at suitable positions and an image is printed.

The color printer 200 described above forms dots while moving the carriage 240 back and forth to print images, so if dots are formed not only during the forward scan of the carriage 240 but also during the backward scan, it is possible to rapidly print images. It makes sense that when performing this kind of bidirectional printing, when dot formation position misalignment occurs between dots formed during the forward scan of the carriage 240 and the dots formed during the backward scan, the image quality will be degraded. In light of this, to avoid this kind of situation, a normal color printer is made to be able to adjust with good precision the timing of forming dots for at least one of during forward scan or backward scan. Because of this, it is possible to match the position at which dots are formed during the forward scan and the position at which dots are formed during the backward scan, and it is possible to rapidly print images with high image quality without degradation of the image quality even when bidirectional printing is performed. However, on the other hand, because it is possible to adjust with good precision the timing of forming dots, a dedicated adjustment mechanism or adjustment program is necessary, and there is a tendency for the color printer to become more complex and larger.

To avoid the occurrence of this kind of problem, with the computer 100 of this embodiment, even when there is a slight displacement of the dot formation position during the forward scan and the backward scan, the presence or absence of dot formation is decided using a dither matrix that makes it possible to suppress to a minimum the effect on image quality. If the presence or absence of dot formation for each pixel is decided by referencing this kind of dither matrix, even if there is slight displacement of the dot formation positions between the forward scan and the backward scan, there is no significant effect on the image quality. Because of this, it is not necessary to adjust with high precision the dot formation position, and it is possible to use simple items for the mechanism and control contents for adjustment, so it is possible to avoid the color printer from becoming needlessly large and complex. Following, the principle that makes this possible is described, and after that, a simple description is given of one method for generating this kind of dither matrix.

D. Principle of Suppressing Degradation of Image Quality Due to Dot Position Misalignment:

The invention of this application was completed with the discovery of new findings regarding images formed using the dither matrix as the beginning. In light of this, first, the findings we newly discovered as the beginning of the invention of this application are explained.

Figure 9:
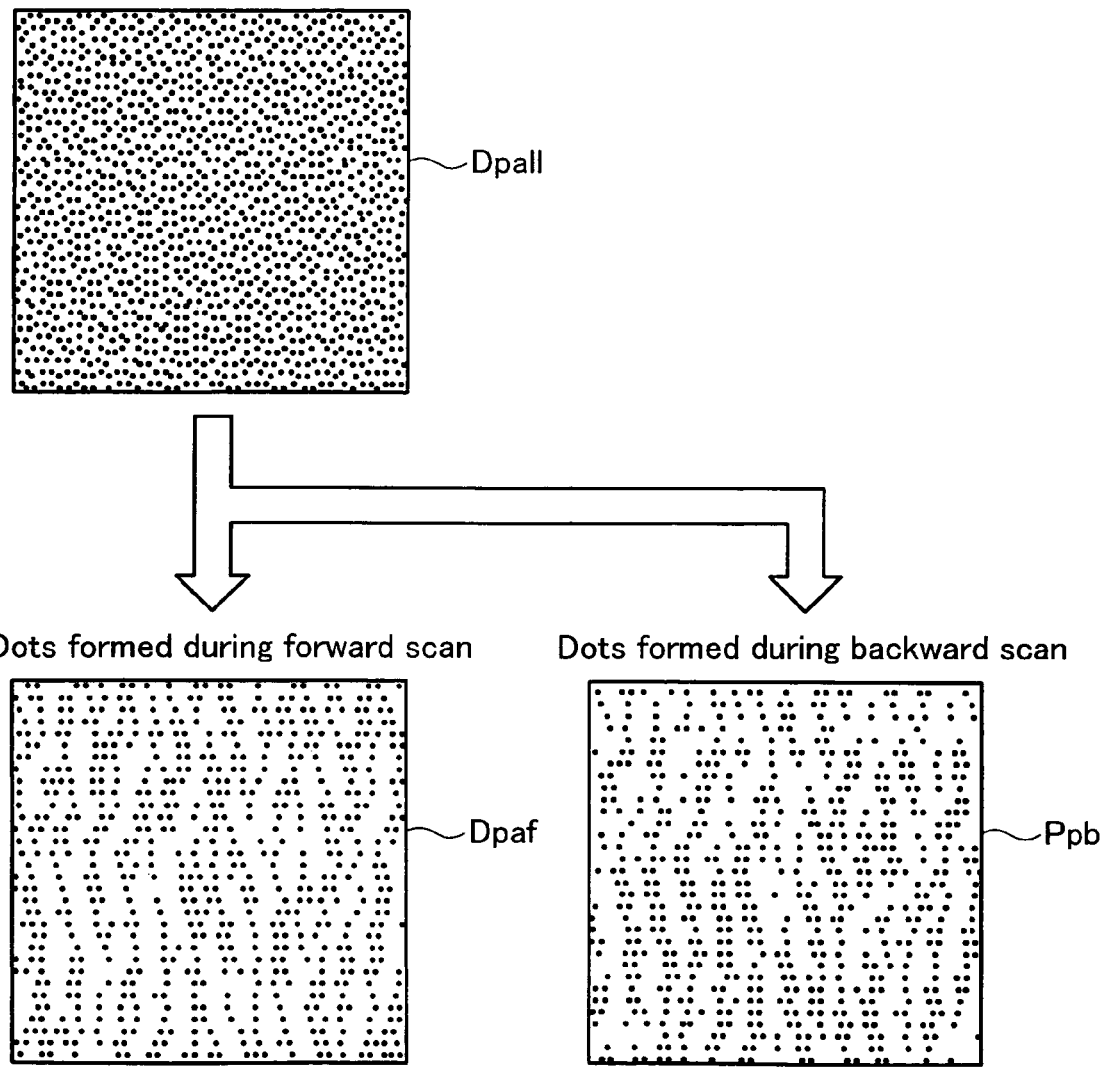
FIG. 9 is an explanatory drawing showing the findings that became the beginning of the invention of this application.

FIG. 9 is an explanatory drawing showing the findings that became the beginning of the invention of this application. Overall dot distribution Dpall shows an expanded view of the state of dots being formed at a specified density for forming images of certain tone values. As shown in Overall dot distribution Dpall, to obtain the optimal image quality image, it is necessary to form dots in a state dispersed as thoroughly as possible.

To form dots in a thoroughly dispersed state in this way, it is known that it is possible to reference a dither matrix having so-called blue noise characteristics to decide the presence or absence of dot formation. Here, a dither matrix having blue noise characteristics means a matrix like the following. Specifically, it means a dither matrix for which while dots are formed irregularly, the spatial frequency component of the set threshold value has the largest component in a high frequency range for which one cycle is two pixels or less. Note that bright (high brightness level) images and the like can also be cases when dots are formed in regular patterns near a specific brightness level.

Figure 10:
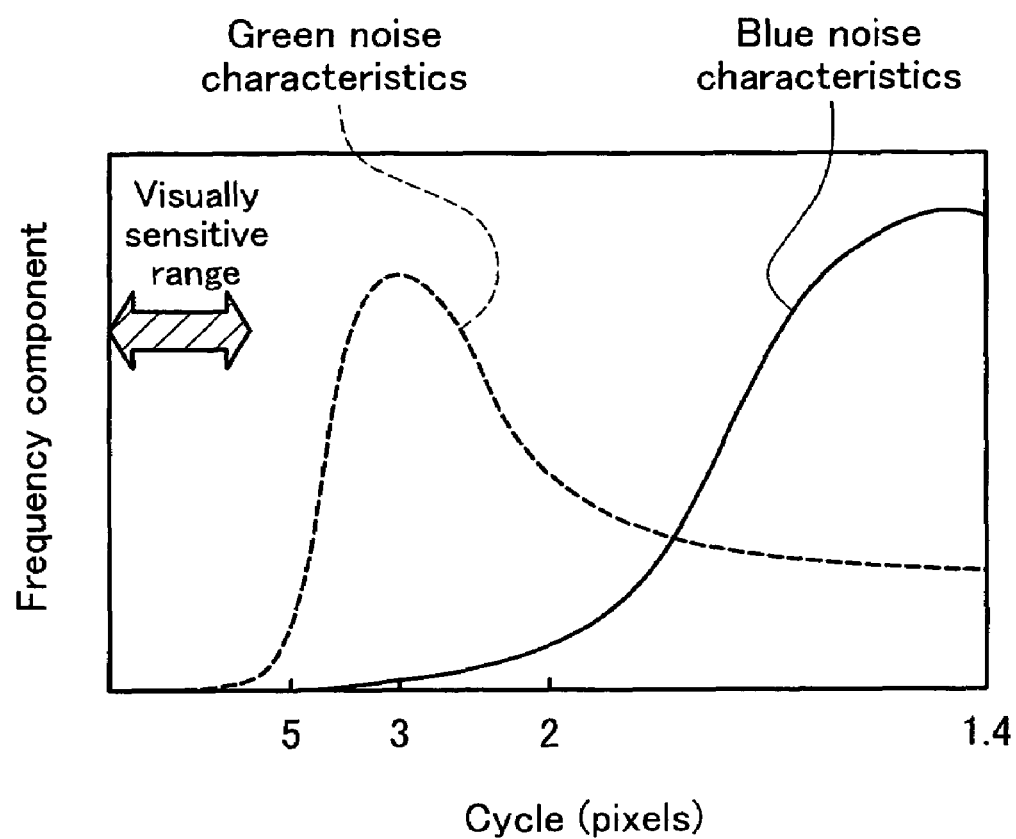
FIG. 10 is an explanatory drawing conceptually showing an example the spatial frequency characteristics of threshold values set for each pixel of the dither matrix having blue noise characteristics.

FIG. 10 is an explanatory drawing that conceptually shows an example of the spatial frequency characteristics of the threshold values set for each pixel of a dither matrix having blue noise characteristics (following, this may also be called a blue noise matrix). Note that with FIG. 10, in addition to the blue noise matrix spatial frequency characteristics, there is also a display regarding the spatial frequency characteristics of the threshold values set in a dither matrix having so called green noise characteristics (hereafter, this is also called a green noise matrix). The green noise matrix spatial frequency characteristics will be described later, but first, the blue noise matrix spatial frequency characteristics are described.

In FIG. 10, due to circumstances of display, instead of using spatial frequency for the horizontal axis, cycles are used. It goes without saying that the shorter the cycle, the higher the spatial frequency. Also, the vertical axis of FIG. 10 shows the spatial frequency component for each of the cycles. Note that the frequency components shown in the drawing indicate a state of being smoothed so that the changes are smooth to a certain degree.

The spatial frequency component of the threshold values set for the blue noise matrix is shown by example using the solid line in the drawing. As shown in the drawing, the blue noise matrix spatial frequency characteristics are characteristics having the maximum frequency component in the high frequency range for which one cycle length is two pixels or less. The threshold values of the blue noise matrix are set to have this kind of spatial frequency characteristics, so if the presence or absence of dot formation is decided based on a matrix having this kind of characteristics, then dots are formed in a state separated from each other.

From the kinds of reasons described above, if the presence or absence of dot formation for each pixel is decided while referencing a dither matrix having blue noise characteristics, as shown in the Overall dot distribution Dpall, it is possible to obtain an image with thoroughly dispersed dots. Conversely, because dots are generated dispersed thoroughly as shown in the Overall dot distribution Dpall, threshold values adjusted so as to have blue noise characteristics are set in the dither matrix.

Note that here, the spatial frequency characteristics of the threshold values set in the green noise matrix shown in FIG. 10 are described. The dotted line curve shown in FIG. 10 shows an example of green noise matrix spatial frequency characteristics. As shown in the drawing, green noise matrix spatial frequency characteristics are characteristics having the largest frequency component in the medium frequency range for which the length of one cycle is from two pixels to ten or more pixels. The green noise matrix threshold values are set so as to have this kind of spatial frequency characteristics, so when the presence or absence of dot formation for each pixel is decided while referencing a dither matrix having green noise characteristics, while dots are formed adjacent in several dot units, overall, the dot group is formed in a dispersed state. As with a so-called laser printer or the like, with a printer for which stable formation of fine dots of approximately one pixel is difficult, by deciding the presence or absence of dot formation while referencing this kind of green noise matrix, it is possible to suppress the occurrence of isolated dots. As a result, it becomes possible to rapidly output images with stable image quality. Conversely, threshold values adjusted to have green noise characteristics are set in the dither matrix referenced when deciding the presence or absence of dot formation with a laser printer or the like.

As described above, with an inkjet printer like the color printer 200, a dither matrix having blue noise characteristics is used, and therefore, as shown in the Overall dot distribution Dpall in FIG. 9, the obtained image is an image with thoroughly dispersed dots. However, when this image is viewed with the dots formed during forward scan of the head separated from the dots formed during the backward scan, we found that the images made only by dots formed during the forward scan (forward scan images) and the images made only by dots formed during the backward scan (backward scan images) do not necessarily have the dots thoroughly dispersed. Dots formed during forward scan Dpf is an image obtained by extracting only the dots formed during the forward scan from the image shown in the Overall dot distribution Dpall. Also, Dots formed during backward scan Dpb is an image obtained by extracting only the dots formed during the backward scan from the image shown in the Overall dot distribution Dpall.

As shown in the drawing, if the dots formed by both the back and forth movements are matched, as shown in the Overall dot distribution Dpall, regardless of the fact that the dots are formed thoroughly, the image of only the dots formed during the forward scan shown in the dots formed during forward scan Dpf or the image of only the dots formed during the backward scan shown in the dots formed during backward scan Dpb are both generated in a state with the dots unbalanced.

In this way, though it is unexpected that there would be a big difference in tendency, if we think in the following way, it seems that this is a phenomenon that occurs half by necessity. Specifically, as described previously, the dot distribution status depends on the setting of the threshold values of the dither matrix, and the dither matrix threshold values are set with special generation of the distribution of the threshold values to have blue noise characteristics so that the dots are dispersed well. Here, among the dither matrix threshold values, threshold values of pixels for which dots are formed during the forward scan or threshold values of pixels for which dots are formed during the backward scan are taken, and with no consideration such as having the distribution of the respective threshold values having blue noise characteristics, the fact that the distribution of these threshold values, in contrast to the blue noise characteristics, have characteristics having a large frequency component in the long frequency range, seems half necessary (see FIG. 10). Also, for a dither matrix having green noise characteristics as well, when we consider that this is a matrix specially set for the threshold value distribution to have green noise characteristics, the threshold values of the pixels for which dots are formed during the forward scan or the backward scan are considered to have a large frequency component on a longer cycle side than the cycle for which the green noise matrix has a large frequency component (see FIG. 10). In the end, when the threshold values of pixels for which dots are formed during the forward scan or the threshold values of pixels for which dots are formed during the backward scan are taken from the dither matrix having blue noise characteristics, the distribution of those threshold values have large frequency components in the Visually sensitive range. Because of this, for example, even when images have dots thoroughly dispersed, when only dots formed during the forward scan or only dots formed during the backward scan are removed, the obtained images respectively are considered to be images for which the dots have unbalance occur such as shown in the dots formed during forward scan Dpf and the dots formed during backward scan Dpb. Specifically, the phenomenon shown in FIG. 9 is not a special phenomenon that occurs with a specific dither matrix, but rather can be thought of as the same phenomenon that occurs with most dither matrixes.

Considering the kind of new findings noted above and the considerations for these findings, studies were done for other dither matrixes as well. With the study, to quantitatively evaluate the results, an index called the granularity index was used. In light of this, before describing the study results, we will give a brief description of the granularity index.

Figures 11A, 11B, 11C:
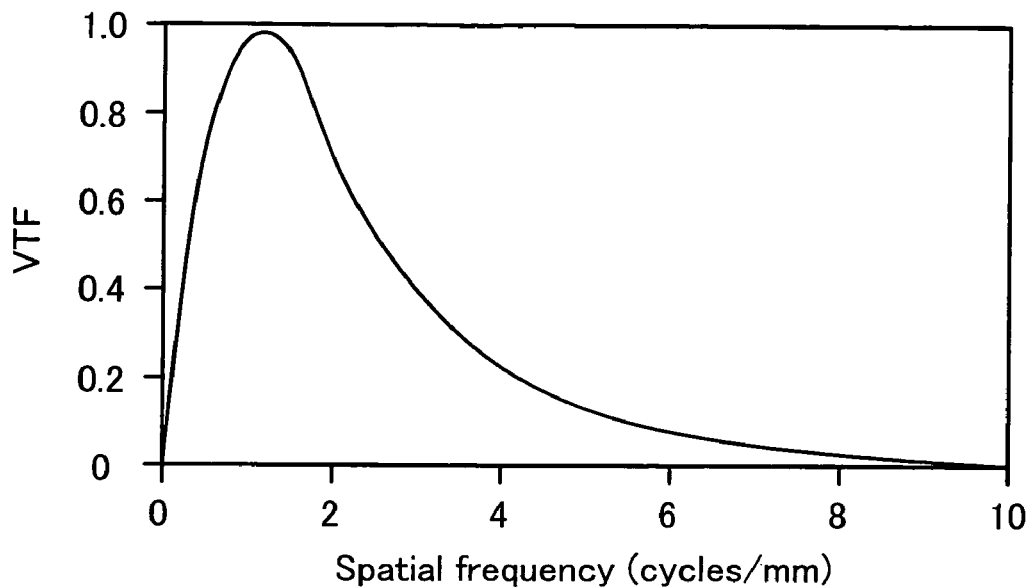
FIGS. 11(A), 11(B), and 11(C) are explanatory drawings conceptually showing the sensitivity characteristics VTF for the spatial frequency of the visual sense that humans have.

FIGS. 11(A), 11(B), and 11(C) are explanatory drawings that conceptually shows the sensitivity characteristics VTF (Visual Transfer Function) to the visual spatial frequency that humans have. As shown in the drawing, human vision has a spatial frequency showing a high sensitivity, and there is a characteristic of the sensitivity decreasing gradually as the spatial frequency increases. It is also known that there is a characteristic of the vision sensitivity decreasing also in ranges for which the spatial frequency is extremely low. An example of this kind of human vision sensitivity characteristic is shown in FIG. 11(A). Various experimental formulae have been proposed as an experimental formula for giving this kind of sensitivity characteristic, but a representative experimental formula is shown in FIG. 11(B). Note that the variable L in FIG. 11 (B) represents the observation distance, and the variable u represents the spatial frequency.

Based on this kind of visual sensitivity characteristic VTF, it is possible to think of a granularity index (specifically, an index representing how easy it is for a dot to stand out). Now, we will assume that a certain image has been Fourier transformed to obtain a power spectrum. If that power spectrum happens to contain a large frequency component, that doesn't necessarily mean that that image will immediately be an image for which the dots stand out. This is because as described previously using FIG. 11 (A), if that frequency is in the low range of human visual sensitivity, for example even if it has a large frequency component, the dots do not stand out that much. Conversely, with frequencies in the high range of human visual sensitivity, for example even when there are only relatively low frequency components, for the entity doing the viewing, there are cases when the dots are sensed to stand out. From this fact, the image is Fourier transformed to obtain a power spectrum FS, the obtained power spectrum FS is weighted to correlate to the human visual sensitivity characteristic VTF, and if integration is done with each spatial frequency, then an index indicating whether or not a human senses the dots as standing out or not is obtained. The granularity index is an index obtained in this way, and can be calculated by the calculation formula shown in FIG. 11 (C). Note that the coefficient K in FIG. 11 (C) is a coefficient for matching the obtained value with the human visual sense.

To confirm that the phenomenon described previously using FIG. 9 is not a special phenomenon that occurs with a specific dither matrix, but rather occurs also with most dither matrixes, the following kind of study was performed on various dither matrixes having blue noise characteristics. First, from among the dots formed by bidirectional printing, images made only by dots formed during the forward scan such as shown in the dots formed during forward scan Dpf (forward scan images) are obtained. Next, the granularity index of the obtained images is calculated. This kind of operation was performed for various dither matrixes while changing the image tone values.

Figure 12A:
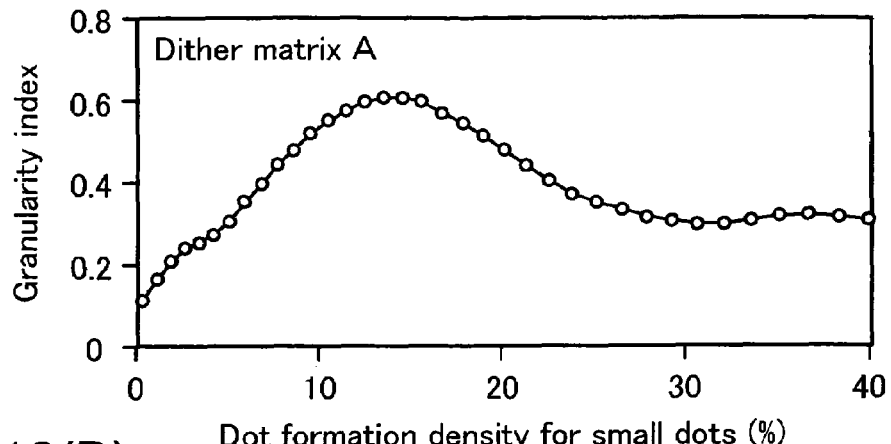
FIGS. 12(A), 12(B), and 12(C) are explanatory drawings showing the results of studying the granularity index of forward scan images for various dither matrixes having blue noise characteristics.
Figure 12B:
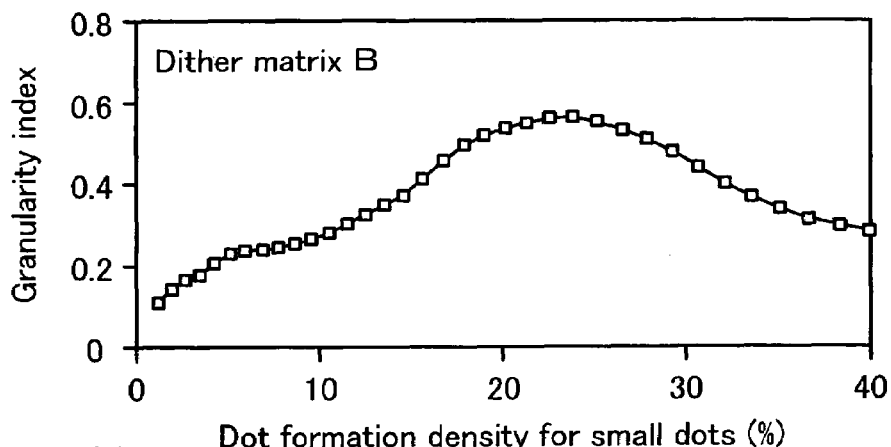
Figure 12C:
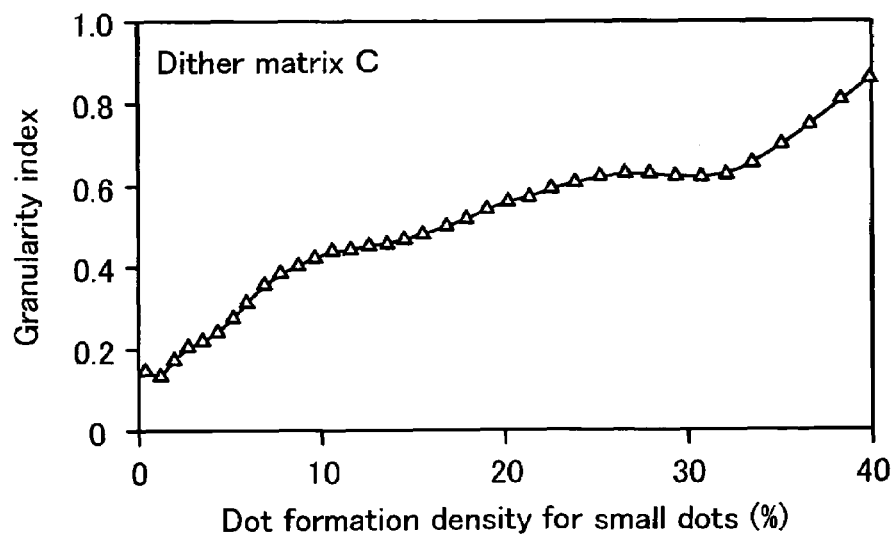

FIGS. 12(A), 12(B), and 12(C) are explanatory drawings showing the results of studying the granularity index of forward scan images for various dither matrixes having blue noise characteristics. Shown in FIGS. 12(A), 12(B), and 12(C) are only the results obtained for three dither matrixes with different resolutions. The dither matrix A shown in FIG. 12 (A) is a dither matrix for printing at a main scan direction resolution of 1440 dpi and Sub-scan direction resolution of 720 dpi, and the dither matrix B shown in FIG. 21 (B) is a dither matrix used for printing at a resolution of 1440 dpi for both the main scan direction and the Sub-scan direction. Also, the dither matrix C shown in FIG. 12 (C) is a dither matrix for printing in the main scan direction at a resolution of 720 dpi and in the Sub-scan direction at a resolution of 1440 dpi. Note that in FIGS. 12(A), 12(B), and 12(C), the horizontal axis is displayed using the small dot formation density, and the areas for which the displayed small dot formation density is 40% or less correlate to areas up to before the intermediate gradation area from the highlight area for which it is considered that the dots stand out relatively easily.

Regardless of the fact that the three forward scan images shown in FIGS. 12(A), 12(B), and 12(C) are generated from individually created dither matrixes for printing respectively at different resolutions, each has an area for which the granularity index is degraded (specifically, an area in which the dots stand out easily). In this kind of area, the forward scan image can be thought of as the dots generating imbalance as shown in the dots formed during forward scan Dpf. In the end, all of the three dither matrixes shown in FIGS. 12(A), 12(B), and 12(C) have blue noise characteristics, and therefore, regardless of the fact that the images formed using bidirectional printing have dots formed without imbalance, in at least part of the gradation area, the forward scan image or the backward scan image has dot imbalance occur. From this, the phenomenon described previously using FIG. 9 can be thought of not as a special phenomenon that occurs with a specific dither matrix but rather as a general phenomenon that occurs with most dither matrixes. Then, when we consider the occurrence of dot imbalance with either forward scan images or backward scan images in this way, this can be thought of as possibly having an effect on the image quality degradation due to dot position misalignment during bidirectional printing. In light of this, we tried studying to see whether or not any kind of correlation can be seen between the granularity index of images formed with an intentional displacement in the dot formation position during bidirectional printing (position misalignment image) and the granularity index of forward scan images.

Figure 13A:
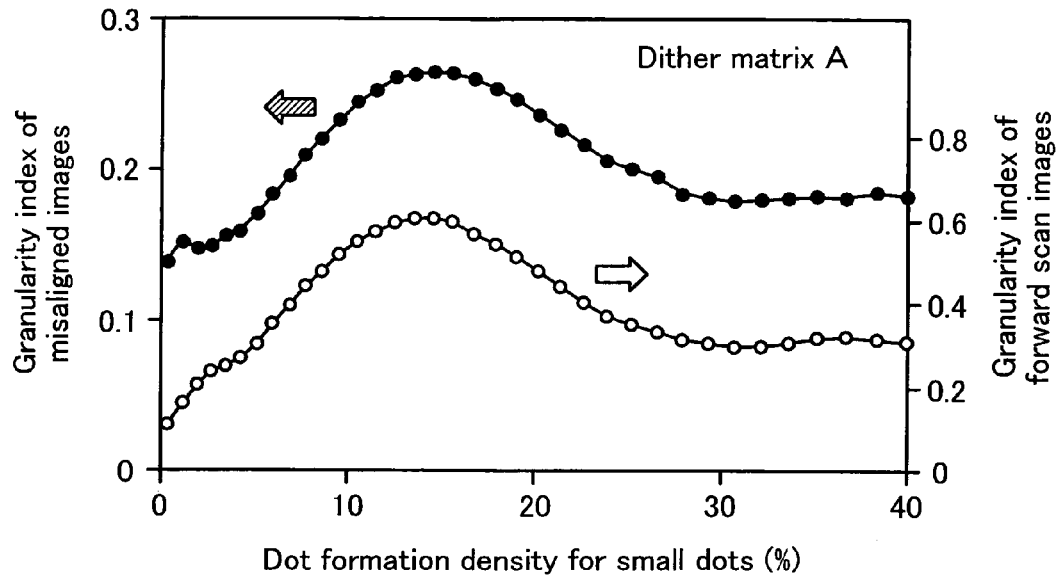
FIGS. 13(A) and 13(B) are explanatory drawings showing the results of studying the correlation coefficient between the position misalignment image granularity index and the forward scan image granularity index.
Figure 13B:
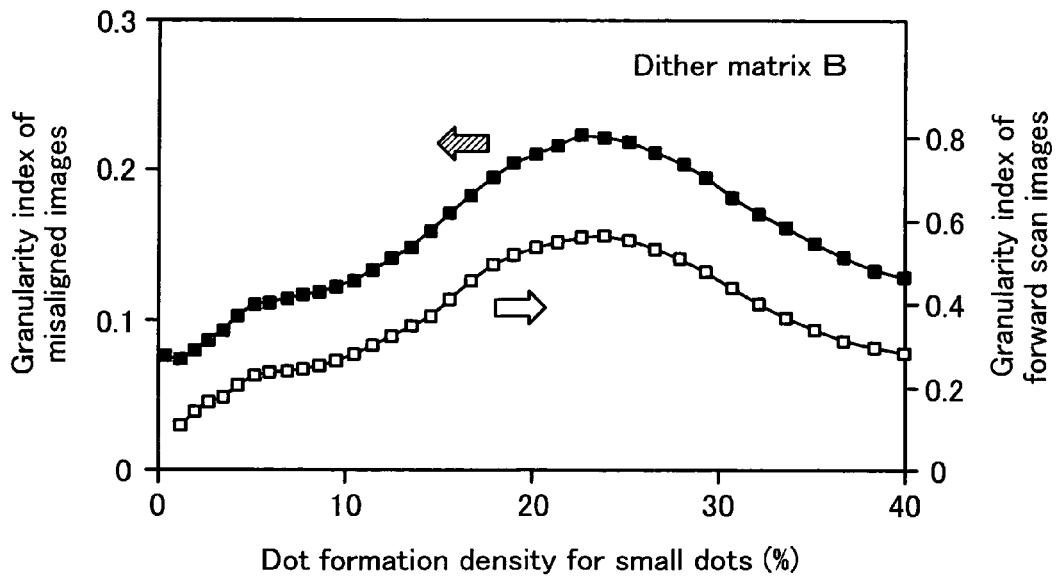

FIGS. 13(A) and 13(B) are explanatory drawings showing the results of studying the correlation coefficient between the position misalignment image granularity index and the forward scan image granularity index. FIG. 13 (A) shows the results of a study on the dither matrix A shown in FIG. 12 (A), and in the drawing, the black circles represent the position misalignment image granularity index and the white circles in the drawing represent the granularity index for the forward scan image. Also, FIG. 13 (B) shows the results of a study on the dither matrix B shown in FIG. 12 (B), and the black squares represent the position misalignment image granularity index while the white squares represent the forward image granularity index. As is clear from FIG. 13, for any of the dither matrixes, a surprisingly strong correlation is seen between the position misalignment image granularity index and the forward image granularity index. From this fact, for the phenomenon of the image quality being degraded by the dot position misalignment during bidirectional printing, the fact that the bidirectional image dot imbalance becomes marked due to displacement of the relative position between the forward scan images and the backward scan images can be considered to be one significant factor. Conversely, if the dot imbalance between the forward scan images and the backward scan images is reduced, for example even when dot position misalignment occurs during bidirectional printing, it is thought that it is possible to suppress image quality degradation.

Figure 14:
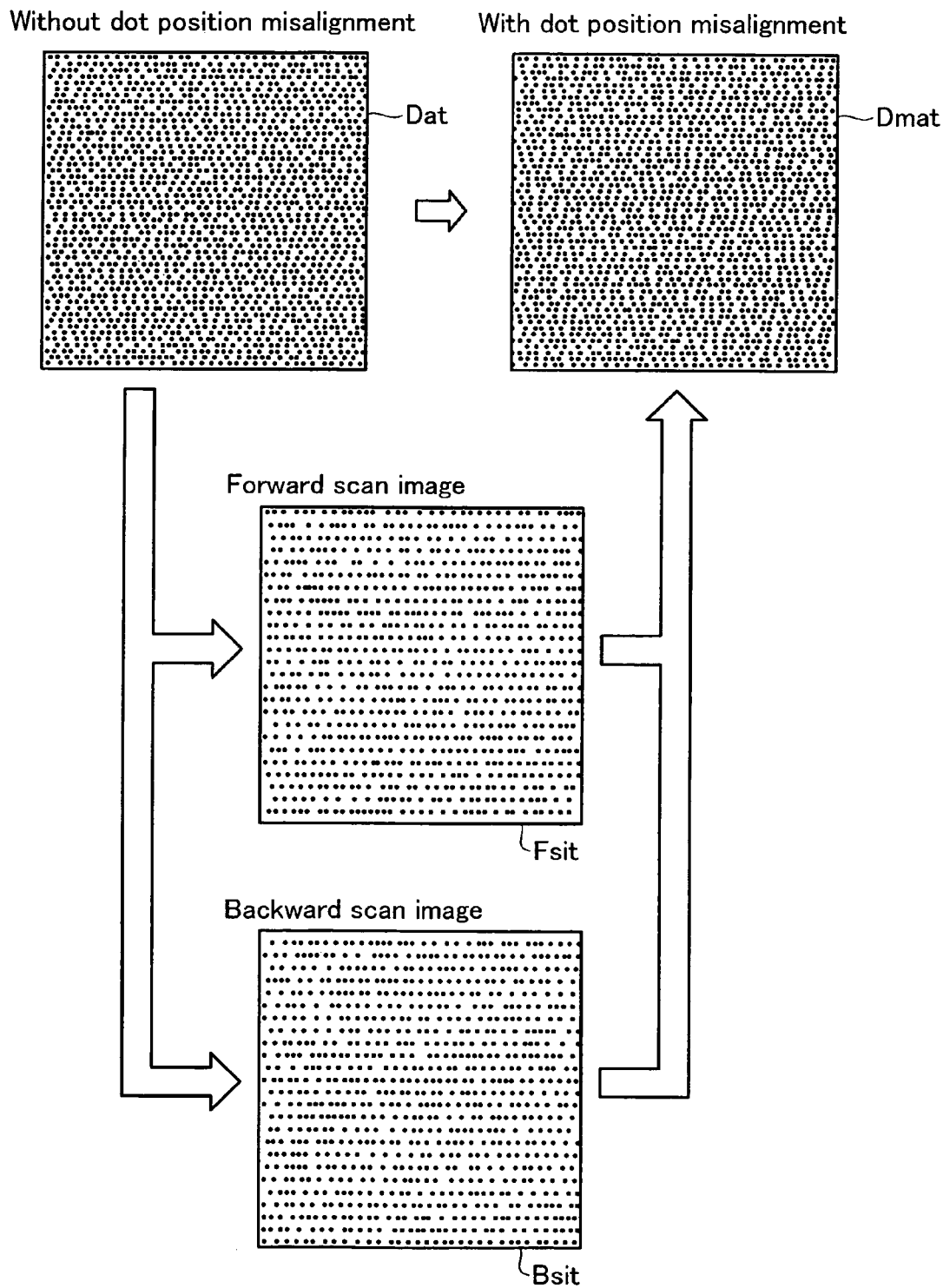
FIG. 14 is an explanatory drawing showing the principle of it being possible to suppress the image quality degradation even when dot position misalignment occurs during bidirectional printing.

FIG. 14 is an explanatory drawing showing that it is possible to suppress the image quality degradation when dot position misalignment occurs during bidirectional printing if the dot imbalance is reduced for images during forward scan and images during backward scan. Dot pattern Dat and dot pattern Dmat show a comparison of an image for which bidirectional printing was performed in a state without dot position misalignment and an image printed in a state with intentional displacement by a specified volume of the dot formation position. Also, shown respectively in FIG. 14, Forward scan image Fsit and Backward scan image Bsit are images obtained by breaking down into an image made only by dots formed during the forward scan of the head (forward scan image) and an image made only by dots formed during the backward scan (backward scan image).

As shown in the forward scan image Fsit and the backward scan image Bsit, the forward scan images and the backward scan images are both images for which the dots are dispersed thoroughly. Also, as shown in the forward scan image Fsit, in the state with no dot position misalignment, images obtained by synthesizing the forward scan images and backward scan images (specifically, images obtained with bidirectional printing) are also images for which the dots are dispersed thoroughly. In this way, not just images obtained by performing bidirectional printing, but also when broken down into forward scan images and backward images, images that have the dots dispersed thoroughly with the respective images can be obtained by deciding the presence or absence of dot formation while referencing a dither matrix having the kind of characteristics described later in the tone number conversion process of FIG. 5. Then, the backward scan image Bsit correlates to an image for which this kind of forward scan image and backward scan image are overlapped in a state displaced by a specified amount.

If the image without position misalignment (left side image) shown in the forward scan image Fsit and the image with position misalignment (right side image) are compared, by the dot position being displaced, the right side image has its dots stand out slightly more easily than the left side image with no displacement, but we can understand that this is not at a level that greatly degrades the image quality. This is thought to show that even when broken down into forward scan images and backward scan images, if dots are generated so that the dots are dispersed thoroughly, for example even when dot position misalignment occurs during bidirectional printing, it is possible to greatly suppress degradation of image quality due to this.

Figure 15:
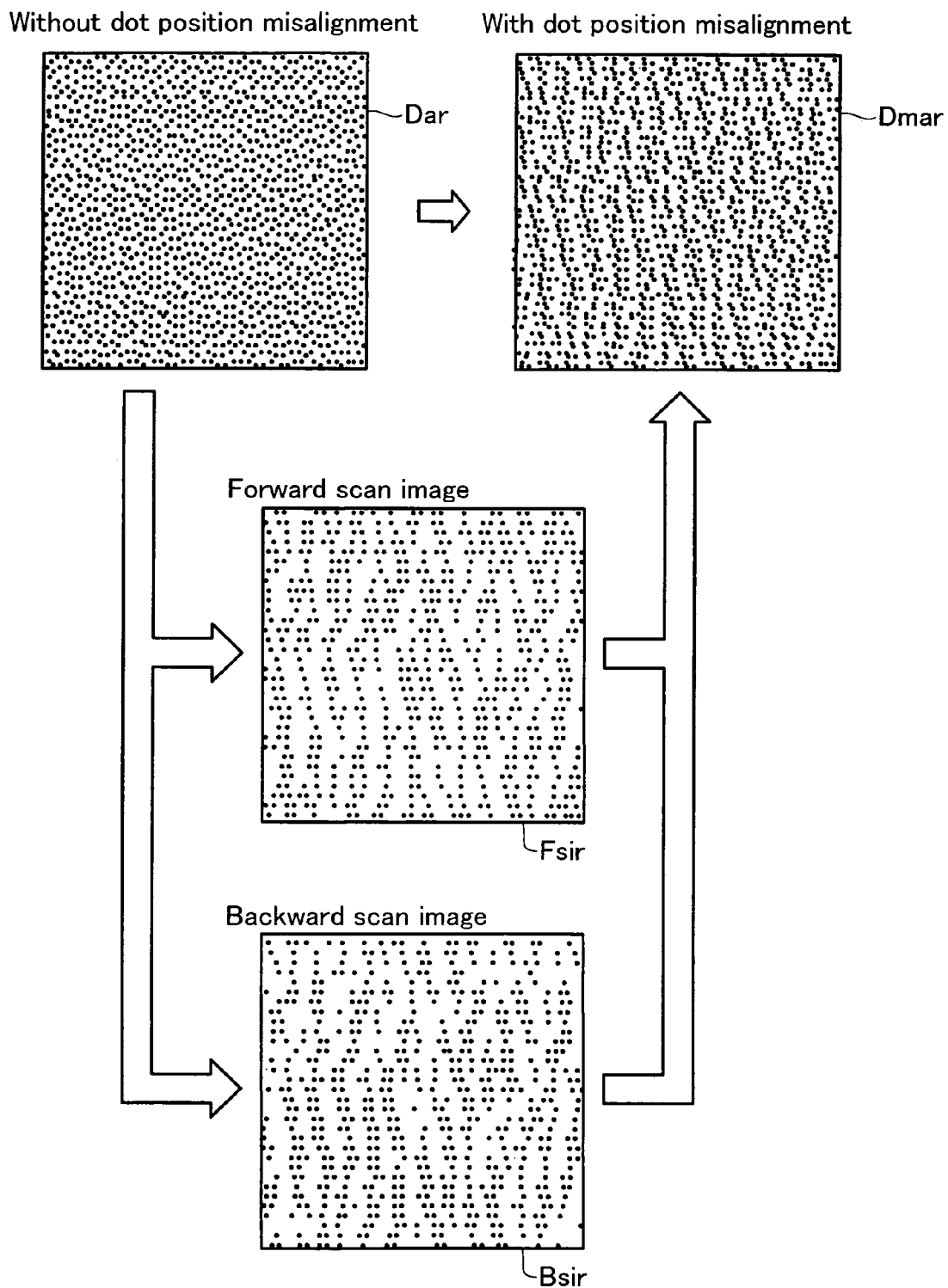
FIG. 15 is an explanatory drawing showing the degradation of image quality due to presence or absence of dot position misalignment with images formed using a general dither matrix.

As a reference, with the image formed using a typical dither matrix, we checked to what degree image quality degraded when dot position misalignment occurred by the same amount as the case shown in FIG. 14. FIG. 15 is an explanatory drawing showing degradation of the image quality due to the presence or absence of dot position misalignment with the image formed by a typical dither matrix. The image without position misalignment (left side image) shown in Dot pattern Dar is an image for which the forward scan image and backward scan image shown in FIG. 9 are overlapped without any position misalignment. Also, the image with position misalignment shown in Dot pattern Dar is an image for which the forward scan image and the backward scan image are overlapped in a state with the position displaced by the same amount as the case shown in FIG. 14. Note that in the forward scan image Fsir and the backward scan image Bsir, the respective forward scan images and backward scan images are shown.

As is clear from FIG. 15, when dots are generated with imbalance with the forward scan image and the backward scan image, it is possible to confirm that when the dot formation positions are displaced during bidirectional printing, there is great degradation of the image quality when the image quality is greatly degraded [sic]. Also, when FIG. 14 and FIG. 15 are compared, by thoroughly dispersing the dots with the forward scan image and the backward scan image, it is possible to understand that the image quality degradation due to dot position misalignment can be dramatically improved.

With the color printer 200 of this embodiment, based on this kind of principle, it is possible to suppress to a minimum the image quality degradation due to dot position misalignment during bidirectional printing. Because of this, during bidirectional printing, even when the formation positions of the dots formed during forward scan and the dots formed during backward scan are not matched with high precision, there is no degradation of image quality. As a result, there is no need for a mechanism or control program for adjusting with good precision the dot position misalignment, so it is possible to use a simple constitution for the printer. Furthermore, it is possible to reduce the precision required for the mechanism for moving the head back and forth as well, and this point also makes it possible to simplify the printer constitution.

E. Dither Matrix Generating Method:

Next, a simple description is given of an example of a method of generating a dither matrix to be referenced by the tone number conversion process of this embodiment. Specifically, with the tone number conversion process of this embodiment, for dots formed during the forward scan, for dots formed during the backward scan, and furthermore, for combinations of these dots, dots are generated in a thoroughly dispersed state, so gradation conversion processing is performed while referencing a dither matrix having the following two kinds of characteristics.

"First Characteristic": The dither matrix pixel positions can be classified into first pixel position groups and second pixel position groups. Here, the first pixel position and the second pixel position mean pixel positions having a mutual relationship such that when dots are formed by either the forward scan or the backward scan, the other has dots formed by the other.

"Second Characteristic": The dither matrix and a matrix for which the threshold values set for the first pixel position are removed from that dither matrix (first pixel position matrix), and a matrix for which the threshold values set for the second pixel positions are removed (second pixel position matrix) all have either blue noise characteristics or green noise characteristics. Here, a "dither matrix having blue noise characteristics" means the following kind of matrix. Specifically, it means a dither matrix for which dots are generated irregularly and the spatial frequency component of the set threshold values have the largest component in the medium frequency range for which one cycle is from two pixels to ten or more pixels. Also, a "dither matrix having green noise characteristics" means a dither matrix for which dots are formed irregularly and the spatial frequency component of the set threshold values have the largest component in the medium frequency range for which one cycle has from two pixels to ten or more pixels. Note that if these dither matrixes are near a specific brightness, it is also acceptable if there are dots formed in a regular pattern.

As described previously, dither matrixes having these kind of characteristics can definitely not be generated by coincidence, so a brief description is given of an example of a method for generating this kind of dither matrix.

Figure 16:
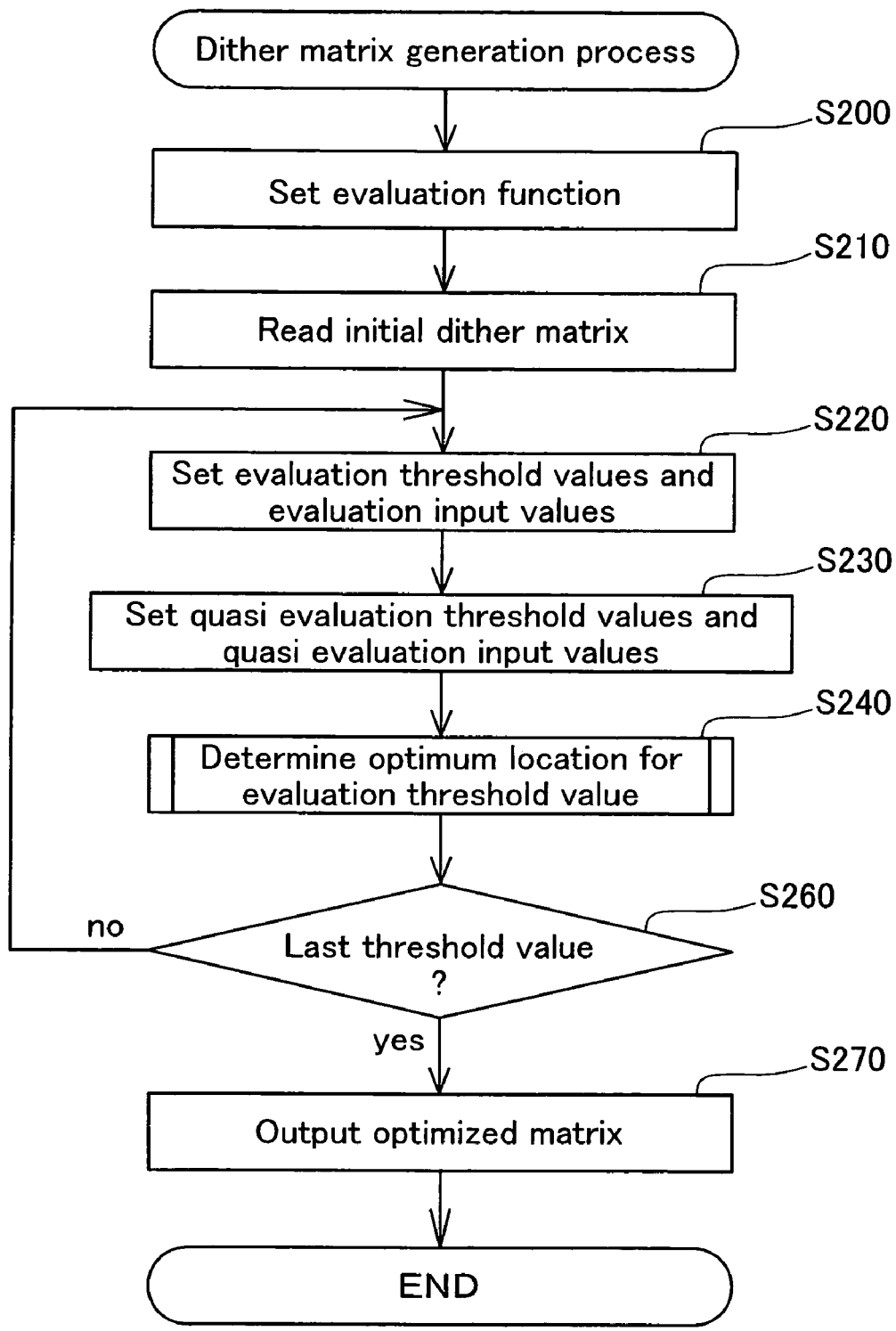
FIG. 16 is a flow chart showing a flow of a process of generating dither matrixes referenced with a tone number conversion process according to the embodiment of the present invention.

FIG. 16 is a flow chart showing the flow of the process of generating a dither matrix referenced with the tone number conversion process of this embodiment. The dither matrix generating process of this embodiment generates the dither matrix by correcting an existing dither matrix having blue noise characteristics or green noise characteristics as an initial matrix so that the "first characteristics" and "second characteristics" described above can be obtained. The reason is that this can effectively reduce the amount of correction and thus the amount of calculation.

At step S200, the operator of dither matrix generation sets an evaluation function for quantifying the optimality of dither matrix. In this embodiment, the evaluation function can be determined as an average granularity index (or granularity evaluation value) of a forward scan image, a backward scan image, and an image for which these are overlapped (or total image). The optimality of dither matrix in this embodiment means maximization of robustness of image quality against variation in relationship of dot formation positions between forward scans and backward scans. This evaluation function is input to a matrix optimization computer (not shown), and used for the dither matrix optimization describe later.

The present invention may also determine by using a granularity evaluation value of image in a plurality of modifications described later. The reason is that the present invention can achieve extremely high computational efficiency, thereby addressing a complex optimization problem such as optimization of dither matrix for reducing deterioration of image quality due to relative misalignment of dot pattern.

At step S210, the matrix optimization computer (not shown) reads, for example, the dither matrix having blue noise characteristics as an initial dither matrix. In this embodiment, the optimality of dither matrix means that the blue noise characteristics is also maintained to a maximum extent against variation in relationship of dot formation positions between forward scans and backward scans.

At step S220, evaluation threshold values and evaluation input values are set. The evaluation threshold value is a threshold values which is stored into an element to be determined, among threshold values to be stored in the dither matrix. The evaluation input values is a minimum input value at which a dot is set to ON by comparison with the evaluation threshold value, that is, a tone value having a same value as the evaluation threshold value. The reason is that in this embodiment, if the tone value of the image data is equal to the threshold value as described above, it is determined that a dot is formed in the particular pixel.

The evaluation threshold values and the evaluation input values are set in the order from a highlight area of lower dot density to a shadow area of higher dot density. Specifically, the evaluation threshold values are set in the increasing order from a threshold value 1 in the range of threshold values 1-255. The evaluation input values are set in the increasing order from a tone value 1 in the range of input tone values 0-255. The reason will be descried later for setting the evaluation threshold values and the evaluation input values in the order from the highlight area to the shadow area.

At step S230, quasi evaluation threshold values and quasi evaluation input values are set. The quasi evaluation threshold value is at least one threshold value which is larger that the evaluation threshold value by a predetermined value. The quasi evaluation input values are a plurality of tone values having a same value as the quasi evaluation threshold values, respectively. The quasi evaluation threshold value and the quasi evaluation input value are used to determine an element which stores the evaluation threshold value as described later.

At step S240, an optimum location, that is, an optimum storage element for the evaluation threshold value is determined. The optimum location for the evaluation threshold value is determined based on the granularity evaluation value, which is an evaluation function set at step S200.

Figure 17:
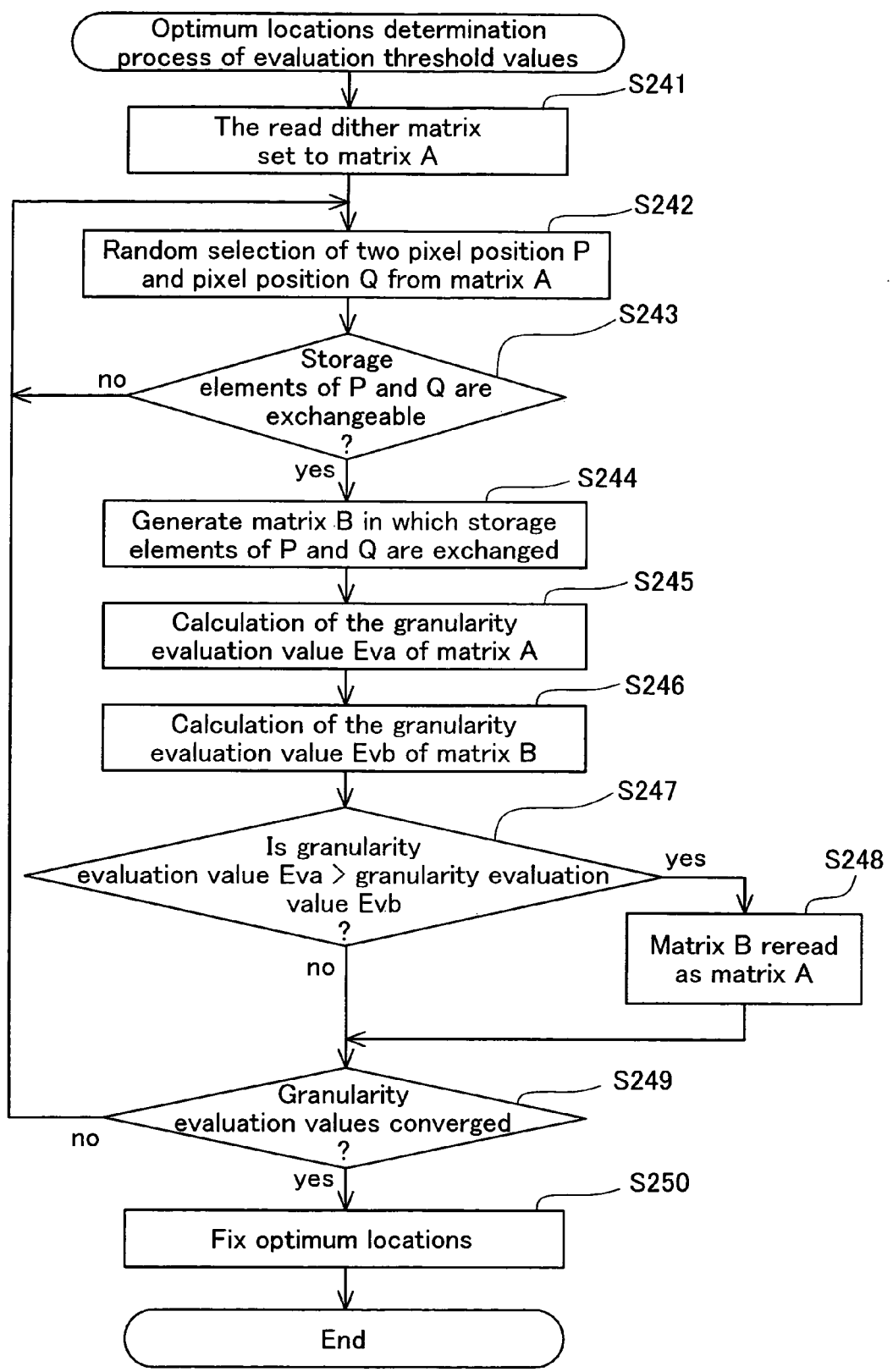
FIG. 17 is a flow chart showing a flow of an optimum location determination process of evaluation threshold value according to the embodiment of the present invention.

FIG. 17 is a flow chart showing the flow of the optimum location determination process of evaluation threshold value according to this embodiment. At step S241, the dither matrix where the optimum location of the former evaluation threshold value is determined is set as a matrix A. Specifically, before the determination of the optimum location of the threshold value 1, the initial dither matrix is set as the matrix A while after the determination of the optimum location of the threshold value 1, the particular dither matrix is set as the matrix A.

At step S242, two elements (an element P and an element Q) are selected randomly from the dither matrix A. At step S244, it is determined whether or not both a threshold value which is stored in the selected element P and a threshold value which is stored in the selected element Q allow their storage elements to be changed. The processing returns to the step S242 if at least one of the threshold values stored in the elements P and Q does not allow the change, that is, if its optimum location has been determined. On the other hand, the processing moves to the step S244 if both the threshold values stored in the elements P and Q allow the change, that is, if their optimum locations have not been determined yet.

At step S244, the threshold value which is stored in the selected element P and the threshold value which is stored in the selected element Q are transposed, and the resulting matrix is set as a matrix B. At step S245, the granularity evaluation value Eva for the matrix A is calculated.

The granularity evaluation value Eva is a granularity evaluation value based on an evaluation dot pattern and a quasi evaluation dot pattern calculated as follows. The evaluation dot pattern is obtained as a simulated image expressed by the presence or absence of dot formation by applying the dither method using the matrix A to the image of the evaluation input tone values. The simulated image includes an evaluation dot pattern where dots are formed during the forward scan, an evaluation dot pattern where dots are formed during the backward scan, and an evaluation dot pattern which is their combination. The plurality of evaluation dot patterns obtained in this manner are obtained by dots being formed in pixels corresponding to elements storing threshold values whose storage elements have been determined and elements storing the evaluation threshold values. The reason is that the storage elements are determined in the increasing order from the smallest threshold value in this embodiment.

The quasi evaluation dot pattern is obtained in the same manner by applying the dither method using the matrix A to the image of the quasi evaluation input tone values. In this embodiment, the granularity evaluation value Eva is calculated by weighting the sum of granularity indexes for the plurality of evaluation dot patterns and the sum of granularity indexes for the plurality of quasi evaluation dot patterns, respectively. Specifically, if the evaluation tone value is equal to 100, for example, the granularity evaluation value Eva is calculated as a summation of six times the sum of granularity indexes for the plurality of evaluation dot patterns obtained by applying the dither method using the matrix A to the image whose input tone value is equal to 100, and the values obtained by multiplying the sums of the granularity indexes of the plurality of evaluation dot patterns having the quasi evaluation tone values 101, 102, 103, 104, and 105 by 5, 4, 3, 2, and 1, respectively.

In this manner, the quasi evaluation dot patterns are used for the evaluation in order to reduce the adverse effect due to the situation where the threshold values which allows their storage elements to be changed get fewer and the elements to be selected as storage elements of threshold values get fewer as the threshold values increases. In this embodiment, the dither matrix is optimized by fixing storage elements in the order from the threshold value for controlling dot locations in a highlight area where the granularity of dots is conspicuous. This provides greater degree of freedom of design for the highlight area where the granularity of dots is conspicuous, and achieves extremely high processing efficiency of optimization since it is only necessary to calculate the granularity index for each input tone.

However, the difference between the highlight area and the shadow area in extent to which the granularity of dots is conspicuous may vary depending on the target characteristics of dither matrix. In such a case, relatively more freedom degree of design is distributed to the shadow area, and thereby increasing the optimality of dither matrix. In this light, the evaluation value also includes quasi evaluation threshold values for areas which are relatively closer to the shadow area. The amount of freedom degree of design distributed to the shadow area can be adjusted arbitrarily by the number of quasi evaluation tone values (three of 101, 102, and 103 in the above example) or weighting.

At step S246, the granularity evaluation value Evb for the matrix B is also calculated in the same manner. At step S247, the granularity evaluation value Eva for the matrix A and the granularity evaluation value Evb for the matrix B are compared. If the granularity evaluation value Eva is larger through the comparison, the matrix B is reread as matrix A (step S248). Otherwise, the processing moves to step S249.

At step S249, it is determined whether or not the granularity evaluation values have converged. That is, a determination is made of whether or not the granularity evaluation value has stabilized, or said another way, whether or not it can be thought of as having reached bottom. For whether or not the granularity evaluation values have converged, for example, when the granularity evaluation value Evb of the matrix B is smaller than the granularity evaluation value Eva of the matrix A, the decrease volume of the granularity evaluation value is obtained, and if this decrease volume is a fixed value or less that is stable across a plurality of operations, it can be determined that the granularity evaluation values have converged. If it is determined that the granularity evaluation values have converged, the processing moves to step S250.

At step S250, optimum locations of evaluation threshold values are fixed. The threshold value whose optimum location has been fixed is not subject to the transposition hereafter, and only the threshold values whose optimum locations are not fixed are subject to the transposition. If the optimum location of the evaluation threshold value is fixed, the processing returns to step S220 (FIG. 16).

Such processing has been carried out on all the threshold values in the range of 1-255 (step S260), and then the optimization of dither matrix is completed and the optimized matrix is output (step S270).

In this embodiment, the dither matrix is optimized by fixing storage elements in the order from the threshold value for controlling dot locations in a highlight area where the granularity of dots is conspicuous. This provides greater degree of freedom of design for the highlight area where the granularity of dots is conspicuous, and achieves extremely high processing efficiency of optimization since it is only necessary to calculate the granularity index for each input tone. In addition, the amount of freedom degree of design distributed to the shadow area can be adjusted since the evaluation value may also include quasi evaluation threshold values for areas which are relatively closer to the shadow area.

Note that with this embodiment, the granularity evaluation value Eva used to evaluate the dither matrix is calculated based on the granularity index that is the subjective evaluation value that uses the visual sensitivity characteristic VTF, but it is also possible to calculate based on the RMS granularity that is the standard deviation of the density distribution, for example.

The granularity index is a well known method and is an evaluation index used widely from the past. However, calculation of the granularity index, as described previously, means obtaining the power spectrum FS by doing Fourier transformation of an image, and it is necessary to add a weighting to the obtained power spectrum FS that correlates to the human visual sensitivity characteristics VTF, so there is the problem of the calculation volume becoming very large. Meanwhile, the RMS granularity is an objective measure representing variance of dot denseness, and this can be calculated simply just by the smoothing process using a smoothing filter set according to the resolution and calculation of the standard deviation of the dot formation density, so it is perfect for optimization processing which has many repeated calculations. In addition, use of the RMS granularity has the advantage of flexible processing being possible considering the human visual sensitivity and visual environment according to the design of the smoothing filter in comparison to the fixed process that uses the human visual sensitivity characteristics VTF.

Also, with the embodiment described above, the first pixel position and the second pixel position were described as pixel positions having a mutual relationship whereby when dots are formed by either of the forward scan or the backward scan, with the other, dots are formed by the other. Specifically, even within a row of pixels aligned in the main scan direction (this kind of pixel alignment is called a "raster"), there are cases when a first pixel position and a second pixel position are included. However, from the perspective of securing image quality during occurrence of dot position misalignment, it is preferable that the first pixel positions and the second pixel positions not be mixed within the same raster. Following is a description of the reason for this.

Figure 18A:
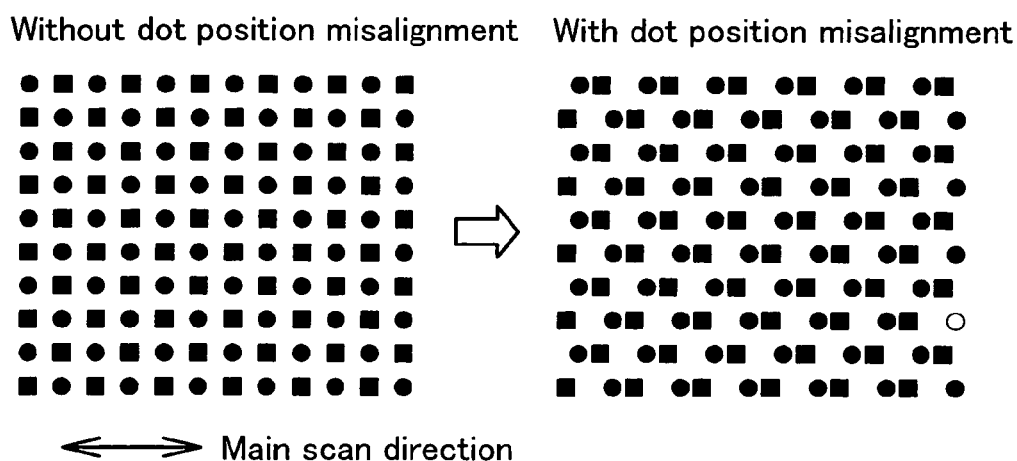
FIGS. 18(A) and 18(B) are explanatory drawings showing the reason that it is possible to ensure image quality during the occurrence of dot position misalignment by not allowing mixing of first pixel positions and second pixel positions within the same raster.
Figure 18B:
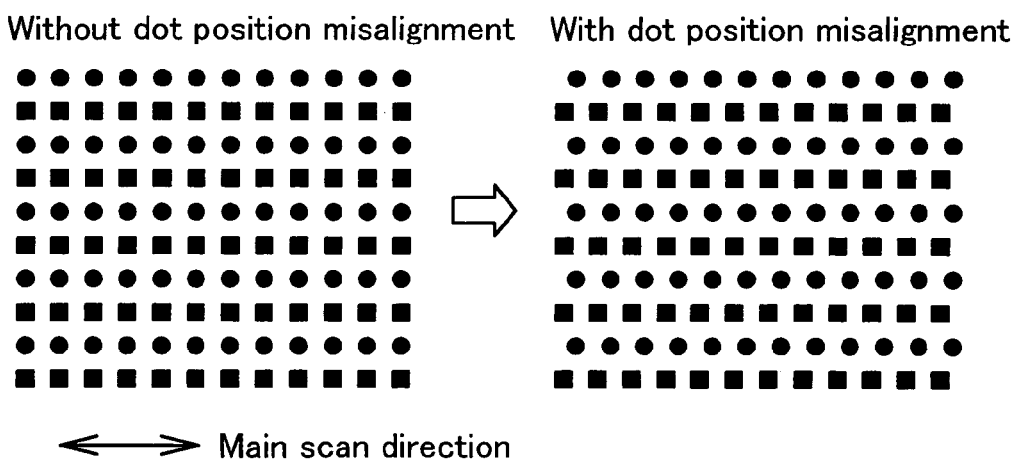

FIGS. 18(A) and 18(B) are explanatory drawings showing the reason that it is possible to ensure image quality when dot position misalignment occurs by not mixing the first pixel positions and the second pixel positions within the same raster. The black circles shown in the drawing indicate dots formed during the forward scan, and the black squares indicate dots formed during the backward scan. Specifically, if one of the black circles or black squares is set as the first pixel position, then the other is set as the second pixel position. FIG. 18 (A) represents a state in which the first pixel position and the second pixel position are mixed in the same raster, and FIG. 18 (B) represents a state in which the first pixel position and the second pixel position are not mixed in the same raster. Also, in the respective drawings, the drawing shown at the left side indicates an image in a state without dot position misalignment, and the drawing at the right side indicates an image in a state with dot position misalignment. As is clear from FIG. 18 (A), when the first pixel position and the second pixel positions are mixed in the same raster, when dot position misalignment occurs, by the distance between dots within the raster occurring at close locations and at distant locations, this degrades the image quality. In comparison to this, as shown in FIG. 18 (B), if the first pixel position and the second pixel position are not mixed in the same raster, for example, even when dot position misalignment occurs, there is no occurrence of the dot distance in a raster being at close locations and distant locations, and it is possible to suppress degradation of the image quality.

In addition, as shown in FIG. 18 (B), if the first pixel position rasters and the second pixel position rasters are arranged alternately, for example, even when dot position misalignment occurs, the dots are displaced in one direction across the subsequent rasters, and it is possible to avoid having this visually recognized, degrading the image quality.

As described above, the first pixel position dither matrix and the second pixel position dither matrix are dither matrixes having blue noise characteristics (or green noise characteristics), and in addition, if the first pixel positions and the second pixel positions are made not to be mixed within the same raster, for example even if the dot formation positions are displaced during bidirectional printing, it is possible to more effectively suppress this from causing degradation of the image quality.

F. VARIATION EXAMPLES

Above, a number of embodiments of the invention were described, but the invention is in no way limited to these kinds of embodiments, and it is possible to embody various aspects in a scope that does not stray from the key points. For example, the following kinds of variation examples are possible.

F-1. First Variation Example

Figure 19:
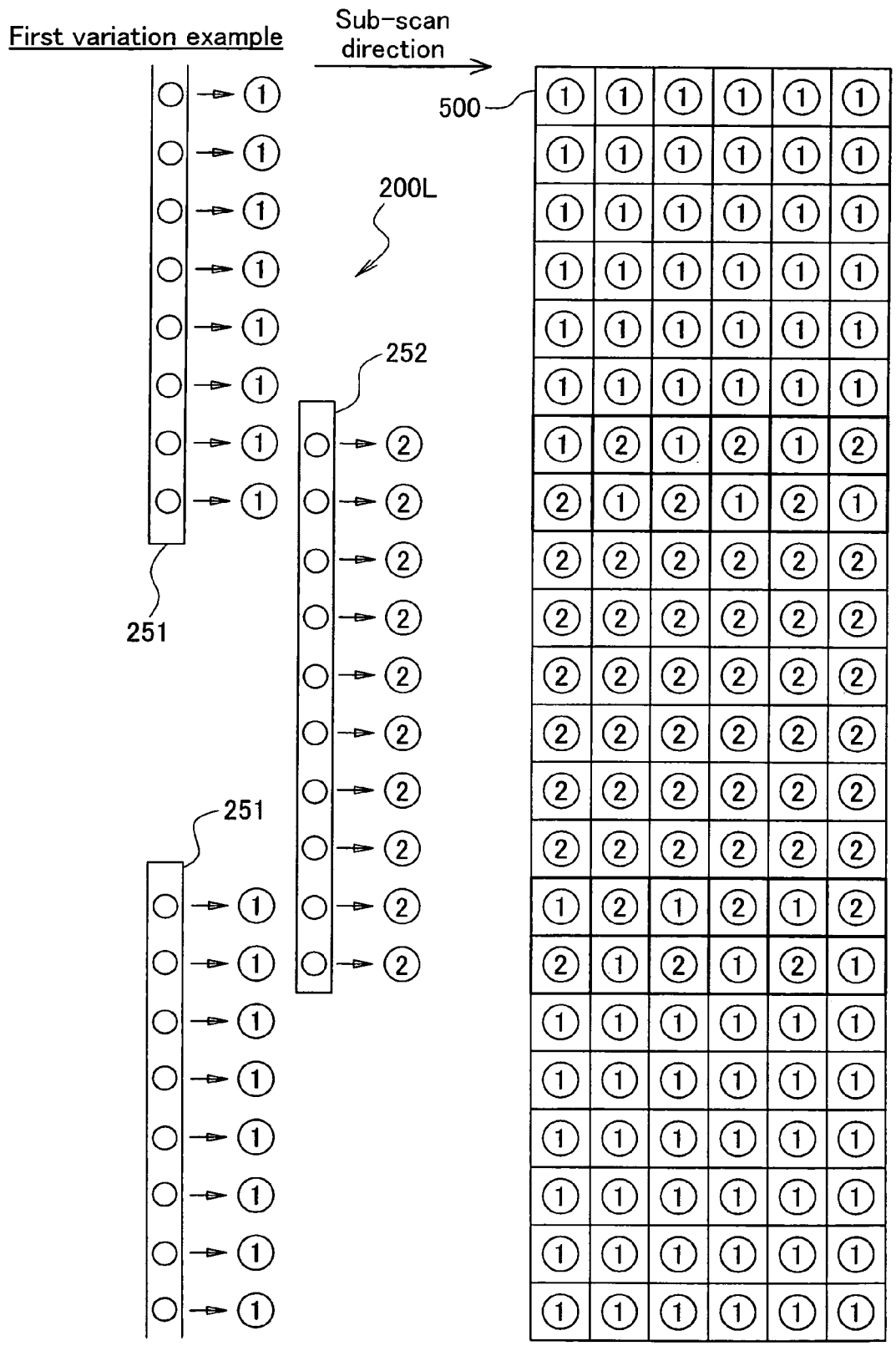
FIG. 19 is an explanatory drawing showing the printing status by line printer 200L having printing heads 251 and 252 for the first variation example of the invention.

FIG. 19 is an explanatory drawing showing the printing state using a line printer 200L having a plurality of printing heads 251 and 252 for the first variation example of the invention. The printing head 251 and the printing head 252 are respectively arranged in a plurality at the upstream side and the downstream side. The line printer 200L is a printer that outputs at high speed by performing only Sub-scan feed without performing the main scan.

Shown at the right side of FIG. 19 is a dot pattern 500 formed by the line printer 200L. The numbers 1 and 2 inside the circles indicate that it is the printing head 251 or 252 that is in charge of dot formation. In specific terms, dots for which the numbers inside the circle are 1 and 2 are respectively formed by the printing head 251 and the printing head 252.

Inside the bold line of the dot pattern 500 is an overlap area at which dots are formed by both the printing head 251 and the printing head 252. The overlap area makes the connection smooth between the printing head 251 and the printing head 252, and is provided to make the difference in the dot formation position that occurs at both ends of the printing heads 251 and 252 not stand out. This is because at both ends of the printing heads 251 and 252, the individual manufacturing difference between the printing heads 251 and 252 is big, and the dot formation position difference also becomes bigger, so there is a demand to make this not stand out clearly.

In this kind of case as well, the same phenomenon as when the dot formation position is displaced between the forward scan and the backward scan as described above occurs due to the error in the mutual positional relationship of the printing heads 251 and 252, so it is possible to try to improve image quality by performing the same process as the embodiment described previously using the pixel position group formed by the printing head 251 and the pixel position group formed by the printing head 252.

F-2. Second Variation Example

FIGS. 20(A) and 20(B) are explanatory drawings showing the state of printing using the interlace recording method for the second variation example of the invention. The interlace recording method means a recording method used when the nozzle pitch k "dots" are 2 or greater measured along the Sub-scan direction of the printing head. With the interlace recording method, a raster line that cannot be recorded between adjacent nozzles with one main scan is left, and the pixels on this raster line are recorded during another main scan. With this variation example, the main scan is also called a pass.

FIG. 20 (A) shows an example of the Sub-scan feed when using four nozzles, and FIG. 20 (B) shows the parameters of that dot recording method. In FIG. 20 (A), the solid line circles containing numbers indicate the Sub-scan direction position of the four nozzles for each pass. Here, "pass" means one main scan. The numbers 0 to 3 in the circles mean the nozzle numbers. The position of the four nozzles is sent in the Sub-scan direction each time one main scan ends.

As shown at the left end of FIG. 20 (A), with this example, the Sub-scan feed volume L is a fixed value of four dots. Therefore, each time a Sub-scan feed is performed, the four nozzle positions are displaced in the Sub-scan direction four dots at a time. Each nozzle has as a recording subject all the dot positions (also called "pixel positions") on the respective raster lines in one main scan. At the right end of FIG. 20 (A) is shown the number of the nozzle that records the dots on each raster line.

In FIG. 20 (B) are shown the various parameters relating to this dot recording method. Included in the parameters of the dot recording method are nozzle pitch k [dots], used nozzle count N [units], and Sub-scan feed volume L [dots]. With the example in FIG. 20, the nozzle pitch k is three dots. The used nozzle count N is four units.

Shown in the table in FIG. 20 (B) are the Sub-scan feed volume L for each pass, the cumulative value ΣL thereof, and the nozzle offset F. Here, the offset F is a value that, when a reference position is assumed for which the offset is 0 for a cyclical position of the nozzles for the first pass 1 (in FIG. 20, the position at every four dots), indicates by how many dots the nozzle position for each pass after that is separated in the Sub-scan direction from the reference position. For example, as shown in FIG. 20 (A), after pass 1, the nozzle position moves in the Sub-scan direction by an amount Sub-scan feed volume L (four dots). Meanwhile, the nozzle pitch k is three dots. Therefore, the offset F of the nozzles for pass 2 is 1 (see FIG. 20 (A)). Similarly, the nozzle position for pass 3 is ΣL=8 dots moved from the initial positions, and the offset F is 2. The nozzle position for pass 4 is ΣL=12 dots moved from the initial position, and the offset F is 0. With pass 4 after three Sub-scan feeds, the nozzle offset F backwards to 0, so with three Sub-scans as one cycle, by repeating this cycle, it is possible to record all the dots on the raster line in an effective recording range.

In this way, with the second variation example, in contrast to embedding the dots with the forward scan and backward scan as described above, dots are embedded with one cycle three passes, so it is conceivable that there will be displacement of mutual positions between each pass in one cycle due to Sub-scan feed error. Because of this, it is possible that the same phenomenon will occur as when the dot formation positions are displaced with the forward scan and backward scan described above, so it is possible to try to improve the image quality using the same process as the embodiments described above with a pixel position group formed with the first pass of each cycle, a pixel position group formed with the second pass, and a pixel position group formed with the third pass.

Note that with the interlace recording method, each cycle does not necessarily embed dots with three passes, and it is also possible to constitute one cycle with two times or four times or more. In this case, it is possible to do group division for each pass that constitutes each cycle.

Also, the group division does not necessarily have to be performed on all the passes that constitute each cycle, and for example, it is also possible to constitute this to be divided into a pixel position group formed with the last pass of each cycle for which Sub-scan feed error accumulation is anticipated and a pixel position group formed with the first pass of each cycle.

F-3. Third Variation Example

FIGS. 21 (A), 21 (B), 21(C) are explanatory drawings showing an example of the actual printing state for the bidirectional printing method of the third variation example of the invention. The letters in the circles indicate which of the forward or backward main scans the dots were formed with. FIG. 21 (A) shows the dot pattern when displacement does not occur in the main scan direction. FIG. 21 (B) and FIG. 21 (C) show the dot patterns when displacement does occur in the main scan direction.

With FIG. 21 (B), in relation to the position of dots formed at the print pixels belonging to the pixel position group for which dots are formed during the forward movement of the printing head, the position of the dots formed at the print pixels belonging to the pixel position group for which dots are formed during the backward scan of the printing head is shifted by 1 dot pitch in the rightward direction. Meanwhile, with FIG. 21 (C), in relation to the position of the dots formed at the print pixels belonging to the pixel position group for which dots are formed during the forward scan of the printing head, the position of the dots formed at the print pixels belonging to the pixel position group for which dots are formed during the backward scan of the printing head is shifted by 1 dot pitch in the leftward direction.

With the embodiments described above, by giving blue noise or green noise spatial frequency distribution to both the dot patterns of the pixel position group for which dots are formed during the forward scan and the dot patterns of the pixel position group for which dots are formed during the backward scan, image quality degradation due to this kind of displacement is suppressed.

In contrast to this, the third variation example is constituted so that the dot pattern for which the dot pattern formed on the pixel position group formed during the forward scan and the dot pattern formed on the pixel position group formed during the backward scan are shifted by 1 dot pitch in the main scan direction and synthesized has blue noise or green noise spatial frequency distribution, or has a small granularity index.

The constitution of the dither matrix focusing on the granularity index can be constituted so that, for example, the average value of the granularity index when the displacement in the main scan direction is shifted by 1 dot pitch in one direction, when it is shifted by 1 dot pitch in the other direction, and when it is not shifted, is a minimum. Alternatively, it is also possible to constitute this such that the spatial frequency distributions in these cases have a mutually high correlation coefficient.

F-4. This invention can also be applied to printing that performs printing using a plurality of printing heads. In specific terms, it is also possible to constitute this so that the spatial frequency distributions of dots formed in a plurality of pixel position groups in charge of dot formation by each of the plurality of printing heads have a mutually high correlation coefficient.

By working in this way, for printing using the plurality of printing heads, it is possible to constitute halftone processing with a high robustness level to displacement of dot formation positions between mutual printing heads, for example.

F-5. Fourth Variation Example

Figure 22:
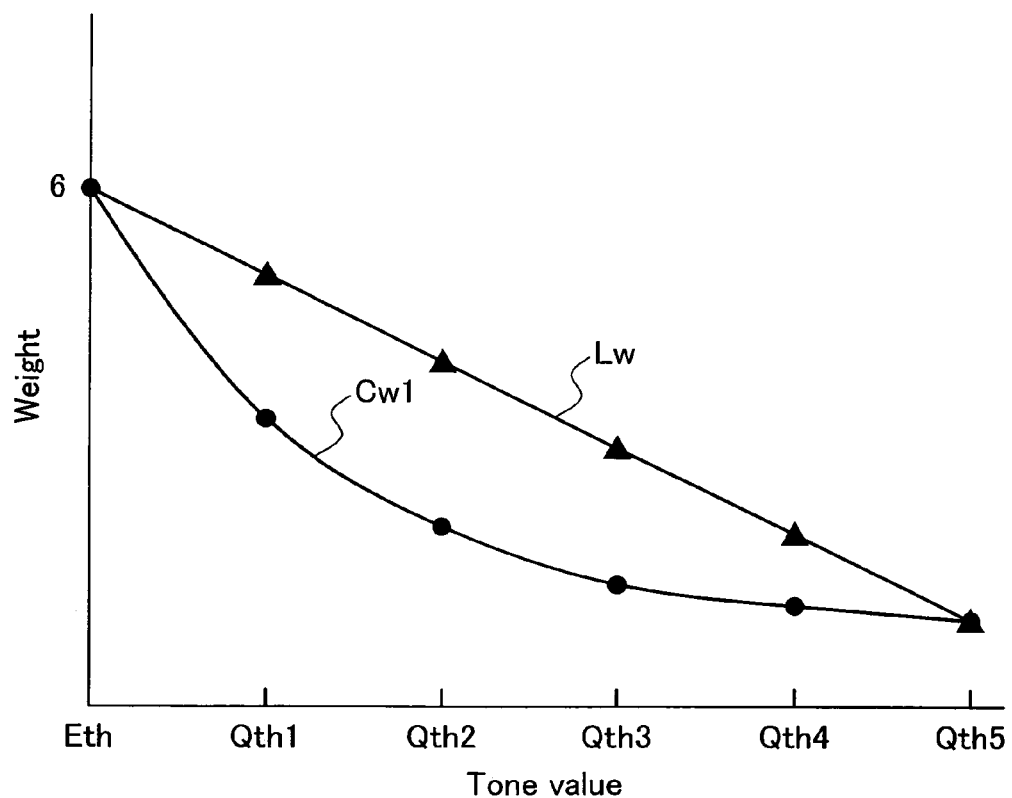
FIG. 22 is a graph showing weights for quasi evaluation threshold values according to a fourth variation example of the present invention.

FIG. 22 is a graph showing weights for evaluation tone value Eth and quasi evaluation tone values Qth1-Qth5 according to a fourth variation example of the present invention. In the graph, triangles plotted on a line Lw represent the weights in the above-described embodiment, and circles plotted on a curve Cw represent the weights in the fourth variation example.

In the above-described embodiment, if the evaluation tone value corresponding to the evaluation threshold value is equal to 100, the granularity evaluation value is calculated as a summation of six times the sum of granularity indexes for the evaluation dot patterns, and the values obtained by multiplying the sums of the granularity indexes of the plurality of evaluation dot patterns having the quasi evaluation tone values 101, 102, 103, 104, and 105 corresponding to the quasi evaluation threshold values by 5, 4, 3, 2, and 1, respectively. In the above-described embodiment, there is a linear relationship (line Lw) between the evaluation tone value or quasi evaluation tone values and the weights.

On the other hand, in the fourth variation example of the present invention, the weights are set so that the curve with which the points representing weights vs. tone values are connected sequentially is convex toward the origin as the curve Cw of FIG. 22. Such a setting has proven significantly effective through the experiments by the inventor. Such a function expressed as a curve which is convex toward the origin, which has proven significantly effective through the experiments by the inventor, includes exponential functions.

F-6. Fifth Variation Example

Figure 23:
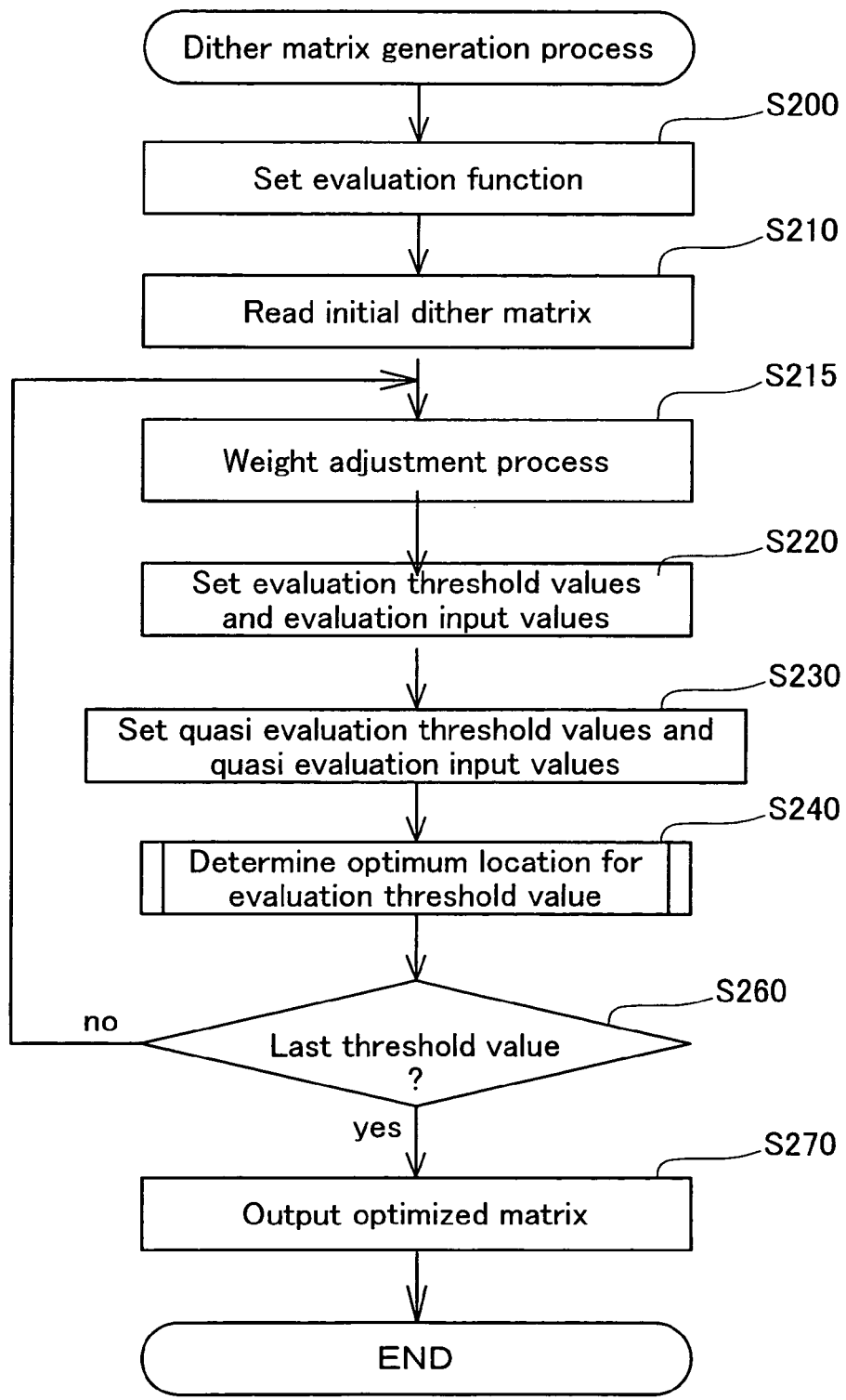
FIG. 23 is a flow chart showing a flow of a process of generating a dither matrix according to a fifth variation example of the present invention.

FIG. 23 is a flow chart showing the flow of the process of generating dither matrixes according to a fifth variation example of the present invention. This flow chart is the flow chart of FIG. 16 to which step S215 is added. At step S215, an initial evaluation value is calculated which is an evaluation value for each tone value of a dither matrix as an initial state, and weights are adjusted according to the initial evaluation value. The adjustment of weight is carried out on each evaluation threshold value in the manner described below.

Figure 24:
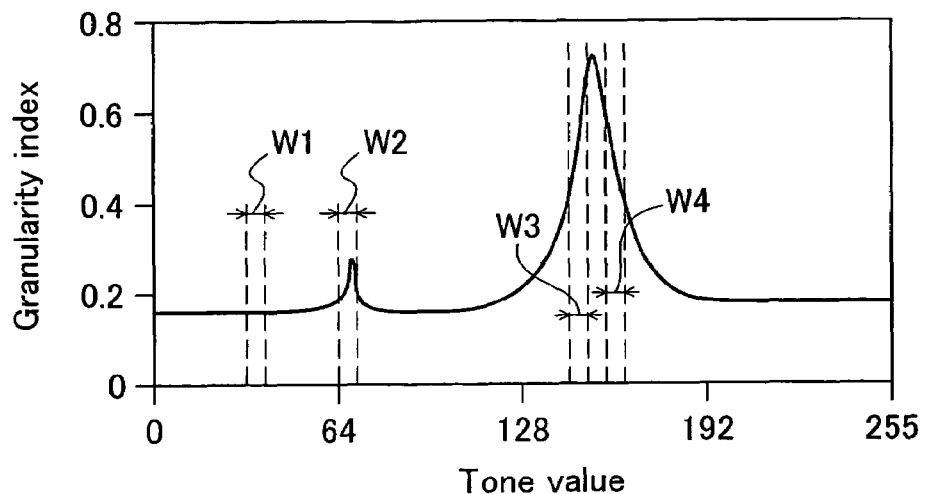
FIG. 24 is an explanatory drawing showing a granularity index of a dither matrix as an initial state.

FIG. 24 is an explanatory drawing showing a granularity index of the dither matrix as the initial state. This dither matrix has larger granularity indexes in the vicinity of tone value 64 and in the vicinity of tone value 150. This means that this dither matrix requires to be improved considerably in the vicinity of tone value 64 and in the vicinity of tone value 150. That is, the improvement on a tone value at which a granularity index is relatively higher in the initial state enables the dither matrix to be optimized more effectively than the improvement on a tone value at which a granularity index is significantly low in the initial state. The fifth variation example is configured to set (or adjust) weights based on this fact.

Figure 25:
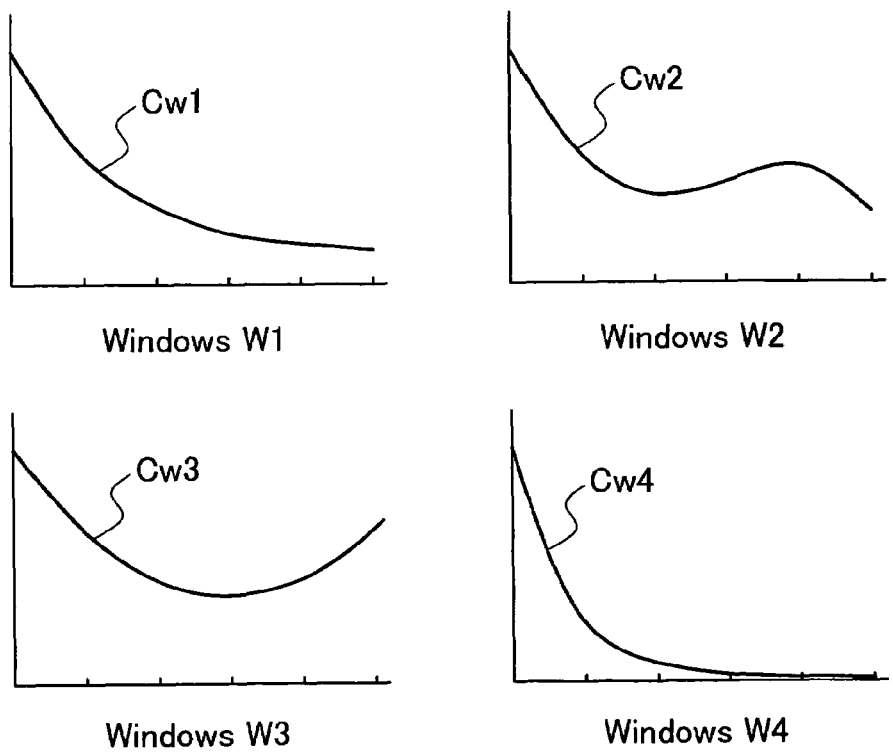
FIG. 25 is an explanatory drawing showing a weight of each quasi evaluation threshold value adjusted according to a fifth variation example of the present invention.

FIG. 25 is an explanatory drawing showing examples of weights in windows W1-W4 of tone values shown in FIG. 24. The window W1 ranges from the tone value 35 to the tone value 40. In the window W1, the curve Cw1 (shown in FIG. 22) is used without any adjustment since the granularity index is constant at a lower level. The window W2 ranges from the tone value 64 to the tone value 69. In the window W2, the curve Cw1 is adjusted to be larger centering around the tone values 67-68 since the granularity index has a peak in the range of tone values 67-68. In the window W3, the curve Cw1 is adjusted to be increasing since the granularity index is increasing in the vicinity of tone value 160. In the window W4, the curve Cw1 is adjusted to be decreasing since the granularity index is decreasing in the vicinity of tone value 170.

In this manner, the fifth variation example has the advantage of having a marked effect since the threshold has a larger weight for evaluation as the evaluation value of the dither matrix as the initial state is further from a target state and there is more room for improvement of the dither matrix. In this variation example, the target state means that the granularity index is equal to zero.

F-7. Note that in the embodiments and the variation examples described above, by comparing for each pixel the threshold values set in the dither matrix and the tone values of the image data, the presence or absence of dot formation is decided for each pixel, but it is also possible to decide the presence or absence of dot formation by comparing the threshold values and the sum of the tone values with a fixed value, for example. Furthermore, it is also possible to decide the presence or absence of dot formation according to the data generated in advance based on threshold value as and on the tone values without directly using the threshold values. The halftone processing of the present invention generally can be a method that decides the presence or absence of dot formation according to the tone value of each pixel and the threshold value set for the pixel position corresponding to the dither matrix.

Three Japanese Patent Applications listed below which the priority of the present application is claimed based on are incorporated herein by reference.
(1) Japanese Patent Application 2005-171274 (Application Date: Jun. 10, 2005)
(2) Japanese Patent Application 2005-208776 (Application Date: Jul. 19, 2005)
(3) Japanese Patent Application 2005-279163 (Application Date: Sep. 27, 2005)

The invention claimed is:

1. A method for generating a dither matrix to print on a print medium, comprising:
setting an evaluation function for calculating an evaluation value of the dither matrix;
providing a dither matrix as an initial state which stores in respective elements each of a plurality of threshold values for deciding presence or absence of dot formation for each pixel according to an input tone value;
fixing an element for storing a threshold value in an increasing order from a smaller threshold value while transposing at least one of the plurality of threshold values stored in a part of the elements and a threshold value stored in another part of the elements; and
outputting a dither matrix in which elements for storing are fixed with regard to at least part of the plurality of threshold values, wherein
the step of fixing an element for storing a threshold value comprises:
transposing mutually part of the threshold values whose elements for storing have not been fixed, among the plurality of threshold values;
calculating an evaluation value of the dither matrix in which the threshold values have been transposed, using the evaluation function;
fixing an element for storing a smallest evaluation threshold value among the threshold values whose elements for storing have not been fixed, according to a compliance of the evaluation value to a predetermined criterion; and
repeating the steps from the transposing step to the fixing step until elements for storing the at least part of the plurality of threshold values are fixed,
wherein each operation of the method for generating the dither matrix is executed by a processor.

2. The method in accordance with claim 1, wherein
the evaluation value is calculated according to a characteristic value of a dot pattern based on a first assumption that dots are formed in a pixel corresponding to an element which stores a threshold value smaller than the evaluation threshold and in a pixel corresponding to an element which stores the evaluation threshold value.

3. The method in accordance with claim 2, wherein
the evaluation value is calculated by multiplying each of characteristic values of a plurality of dot patterns by a predetermined weight, the plurality of dots patterns including the dot pattern based on the first assumption, and at least one dot pattern based on a second assumption that a dot on a pixel of corresponding to each specific threshold value larger than the evaluation threshold value is added to the dot pattern based on the first assumption; and
the predetermined weight is set to be larger as the specific threshold value is closer to the evaluation threshold value.

4. The method in accordance with claim 2, wherein
the evaluation value is calculated by multiplying each of characteristic values of a plurality of dot patterns by a predetermined weight, the plurality of dots patterns including the dot pattern based on the first assumption, and a plurality of dot patterns based on a second assumption that dots on pixels of corresponding to specific threshold values larger than the evaluation threshold value are added to the dot pattern based on the first assumption; and
the predetermined weight is set such that in a two-dimensional graph where the predetermined weight and the specific threshold value are plotted, a curve with which points representing the predetermined weights vs. the specific threshold values are connected sequentially is convex toward the origin.

5. The method in accordance with claim 4, further comprising:
calculating for each threshold value of the dither matrix as the initial state an initial evaluation value according to a characteristic value of a dot pattern based on a third assumption that dots are formed in a pixel corresponding to an element which stores a threshold value smaller than the each threshold and in a pixel corresponding to an element which stores the each threshold value, wherein
the predetermined weight is adjusted to be larger as the initial evaluation value is away from a predetermined target state.

6. The method in accordance with claim 2, wherein
the characteristic value is a correlation coefficient of a plurality of spatial frequency distributions including spatial frequency distribution of the dot pattern and spatial frequency distribution predetermined as a preset target characteristic.

7. The method in accordance with claim 2, wherein
the step of calculating an evaluation value comprises:
using a filter to extract a relatively lower frequency component from the dot pattern; and
calculating a RMS granularity based on the extracted lower frequency component, and calculating the evaluation value according to the RMS granularity.

8. A method for printing on a print medium comprising:
generating dot data according to input image data, the dot data representing dot formation status in each print pixel of a print image to be formed on the print medium; and
forming dots in the each print pixel according to the dot data to generate a print image,
wherein the step of generating dot data comprises a step of using a dither matrix generated by the method in accordance with claim 1 to decide dot formation status in the each print pixel.

9. A printing apparatus for printing on a print medium comprising:
a dot data generator that generates dot data according to input image data, the dot data representing dot formation status in each print pixel of a print image to be formed on the print medium; and
a print unit that forms dots in the each print pixel according to the dot data to generate a print image,
wherein the dot data generator uses a dither matrix generated by the method in accordance with claim 1 to decide dot formation status in the each print pixel.

10. A dither matrix generator for generating a dither matrix from an initial dither matrix in an initial state, wherein
the initial dither matrix stores in respective elements each of a plurality of threshold values for deciding presence or absence of dot formation for each pixel according to an input tone value,
the dither matrix generator comprises:

an element fix unit that fixes an element for storing a threshold value in an increasing order from a smaller threshold value while transposing at least one of the plurality of threshold values stored in a part of the elements and a threshold value stored in another part of the elements; and an output unit that outputs a dither matrix in which elements for storing are fixed with regard to at least part of the plurality of threshold values, wherein the element fixer comprises:

a transpose unit that transposes mutually part of the threshold values whose elements for storing have not been fixed, among the plurality of threshold values;

a calculator that calculates an evaluation value of the dither matrix in which the threshold values have been transposed, using an evaluation function for calculating an evaluation value of the dither matrix; and a fixer that fixes an element for storing a smallest evaluation threshold value among the threshold values whose elements for storing have not been fixed, according to a compliance of the evaluation value to a predetermined criterion.

11. A computer program product for causing a computer to generate a dither matrix, the computer program product comprising:

a computer readable medium; and a computer program stored on the computer readable medium, the computer program comprising:

a first program for the computer to provide a dither matrix as an initial state which stores in respective elements each of a plurality of threshold values for deciding presence or absence of dot formation for each pixel according to an input tone value;

a second program for the computer to fix an element for storing a threshold value in an increasing order from a smaller threshold value while transposing at least one of the plurality of threshold values stored in a part of the elements and a threshold value stored in another part of the elements; and a third program for the computer to output a dither matrix in which elements for storing are fixed with regard to at least part of the plurality of threshold values, wherein the second program comprises:

a program for the computer to transpose mutually part of the threshold values whose elements for storing have not been fixed, among the plurality of threshold values;

a program for the computer to calculate an evaluation value of the dither matrix in which the threshold values have been transposed, using an evaluation function for calculating an evaluation value of the dither matrix; and a program for the computer to fix an element for storing a smallest evaluation threshold value among the threshold values whose elements for storing have not been fixed, according to a compliance of the evaluation value to a predetermined criterion.

* * * * *